(12) United States Patent
Orr et al.

(10) Patent No.: US 10,059,248 B2
(45) Date of Patent: Aug. 28, 2018

(54) CONCENTRIC COUNTER-COIL TIE DOWN SYSTEM FOR QUICKLY SECURING OBJECTS

(71) Applicants: Merrill B. Orr, Phoenix, AZ (US); Marla E. Orr, Phoenix, AZ (US); David O. Burton, Silverado, CA (US); Yvonne E. Burton, Silverado, CA (US); Jeffrey S. Horwich, Lake Forest, CA (US); Michele C. Faraci-Horwich, Lake Forest, CA (US)

(72) Inventors: Merrill B. Orr, Phoenix, AZ (US); Marla E. Orr, Phoenix, AZ (US); David O. Burton, Silverado, CA (US); Yvonne E. Burton, Silverado, CA (US); Jeffrey S. Horwich, Lake Forest, CA (US); Michele C. Faraci-Horwich, Lake Forest, CA (US)

( * ) Notice: Subject to any disclaimer, the term of this patent is extended or adjusted under 35 U.S.C. 154(b) by 29 days.

(21) Appl. No.: 15/178,195

(22) Filed: Jun. 9, 2016

(65) Prior Publication Data

US 2016/0362040 A1 Dec. 15, 2016

Related U.S. Application Data

(60) Provisional application No. 62/173,213, filed on Jun. 9, 2015.

(51) Int. Cl.
*B60P 7/08* (2006.01)
(52) U.S. Cl.
CPC .................. *B60P 7/0807* (2013.01)
(58) Field of Classification Search
CPC ..... B60P 7/0807; B60P 7/0823; B60P 7/0815; B60P 3/07; B60P 3/40; B60P 7/06
USPC ... 410/101, 106, 102, 116, 97, 104, 21, 143, 410/77, 81, 84, 90; 248/499, 500, 503, 248/424, 692; 428/131, 137, 138, 156, 428/166, 172, 167
See application file for complete search history.

(56) References Cited

U.S. PATENT DOCUMENTS

| 395,297 | A | * | 12/1888 | Skiles | B60C 27/12 267/72 |
|---|---|---|---|---|---|
| 3,957,285 | A | | 5/1976 | Schlaeger | |
| 3,977,064 | A | | 8/1976 | Mote et al. | |
| 6,038,746 | A | * | 3/2000 | Anscher | F16G 11/101 24/115 G |
| 6,345,583 | B1 | * | 2/2002 | Thackston | B63B 21/20 114/213 |
| 6,938,315 | B2 | * | 9/2005 | Alanis | B25B 27/24 29/216 |

(Continued)

OTHER PUBLICATIONS

WO, PCT/US2016/036732 ISR and Written Opinion, dated Sep. 7, 2016.

*Primary Examiner* — D Glenn Dayoan
*Assistant Examiner* — Sunsurraye Westbrook
(74) *Attorney, Agent, or Firm* — One LLP; Joseph K. Liu

(57) ABSTRACT

Systems, devices and methods for securing items with respect to a fixed location using an elongate cord-member include a mounting assembly, a first cylindrical coil having a first radius from a central axis, a second cylindrical coil having a second radius from the central axis and oriented coaxially at least partially around the first cylindrical coil, and the first and second cylindrical coils are each coupled to a surface of the mounting assembly.

21 Claims, 47 Drawing Sheets

(56) References Cited

U.S. PATENT DOCUMENTS

| | | | | |
|---|---|---|---|---|
| 7,309,198 | B1* | 12/2007 | Brown | A01K 97/10 410/101 |
| 7,464,443 | B2* | 12/2008 | Lopes Praca | B60P 7/0823 114/218 |
| 9,157,505 | B2* | 10/2015 | Seader | F16G 11/10 |
| 2015/0047197 | A1 | 2/2015 | Deloubes | |

* cited by examiner

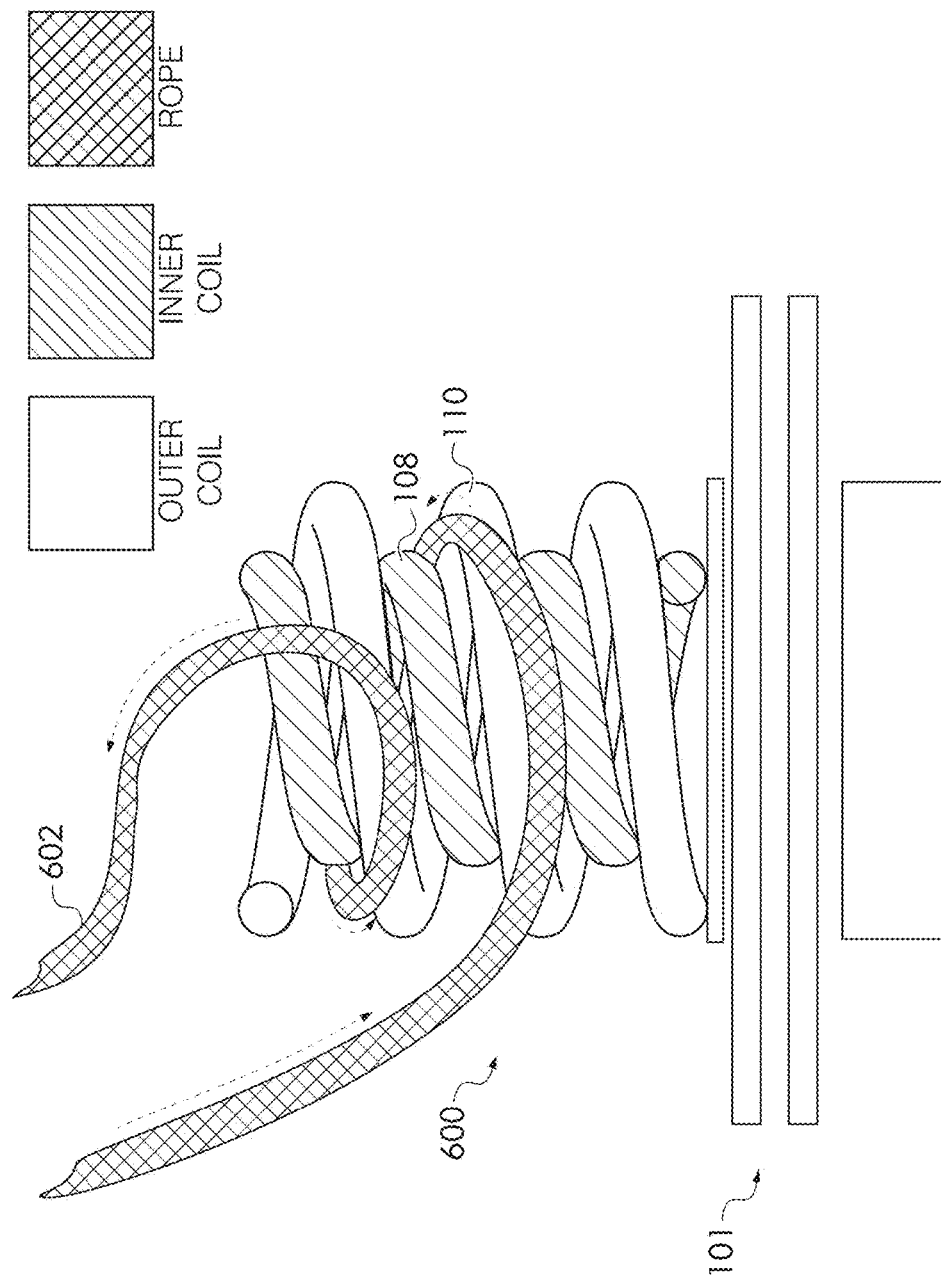

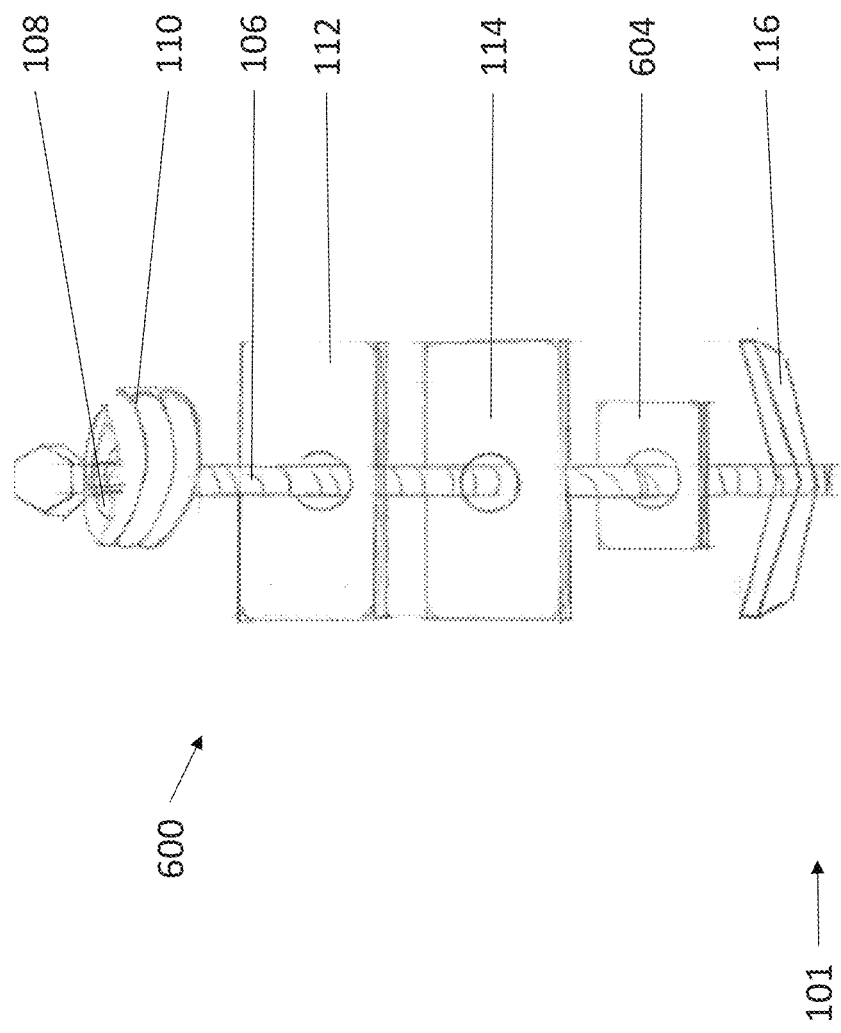

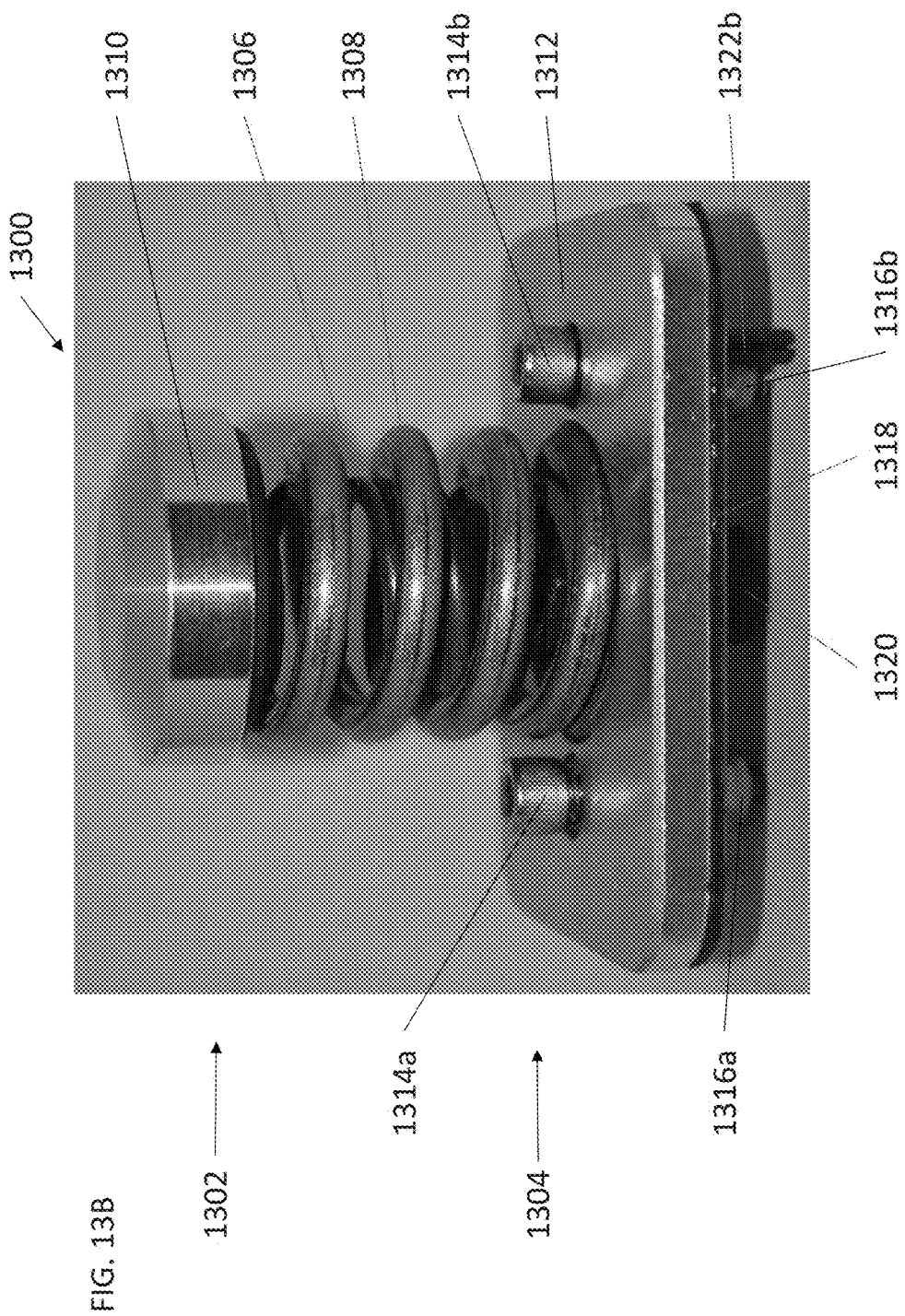

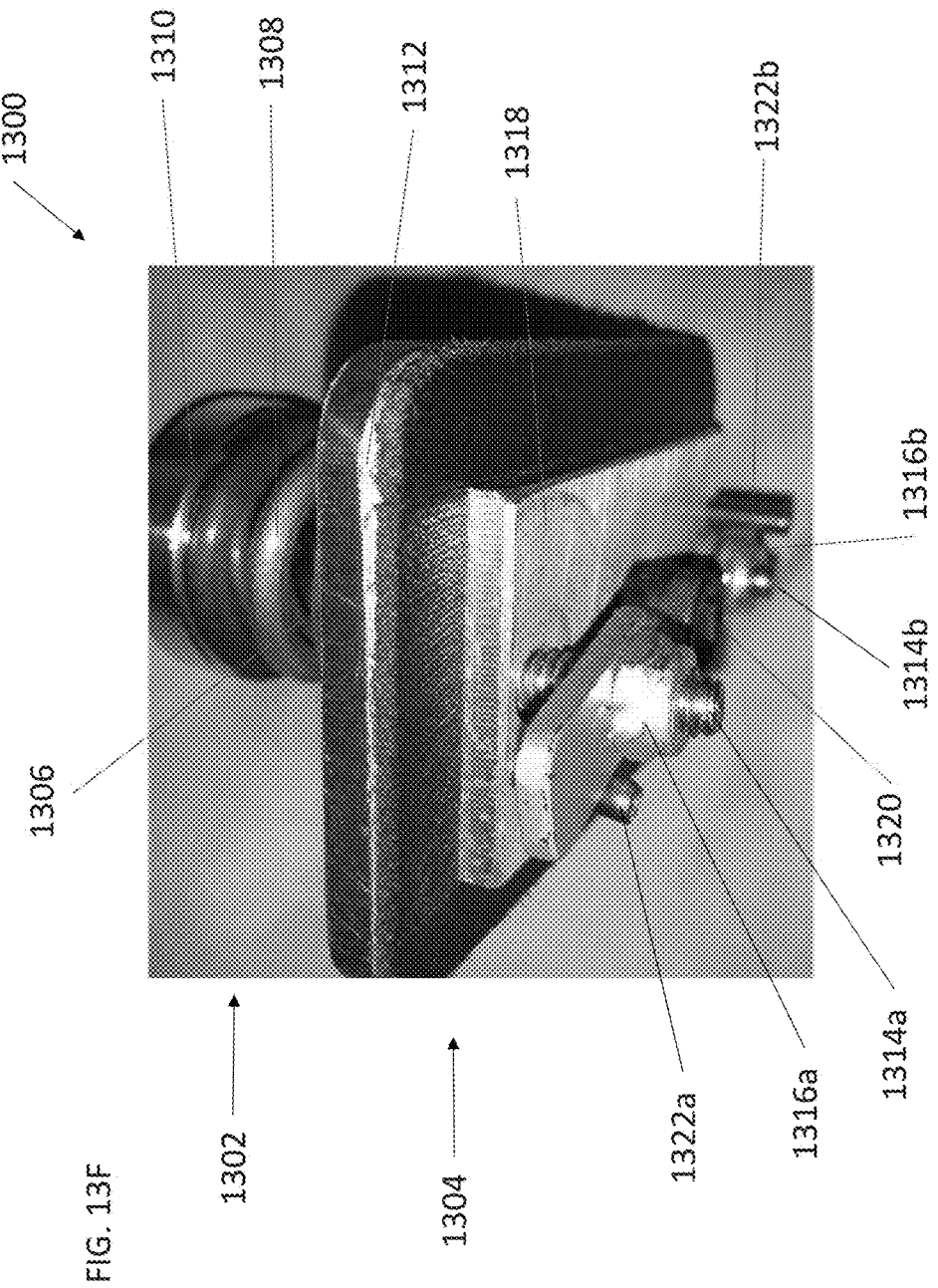

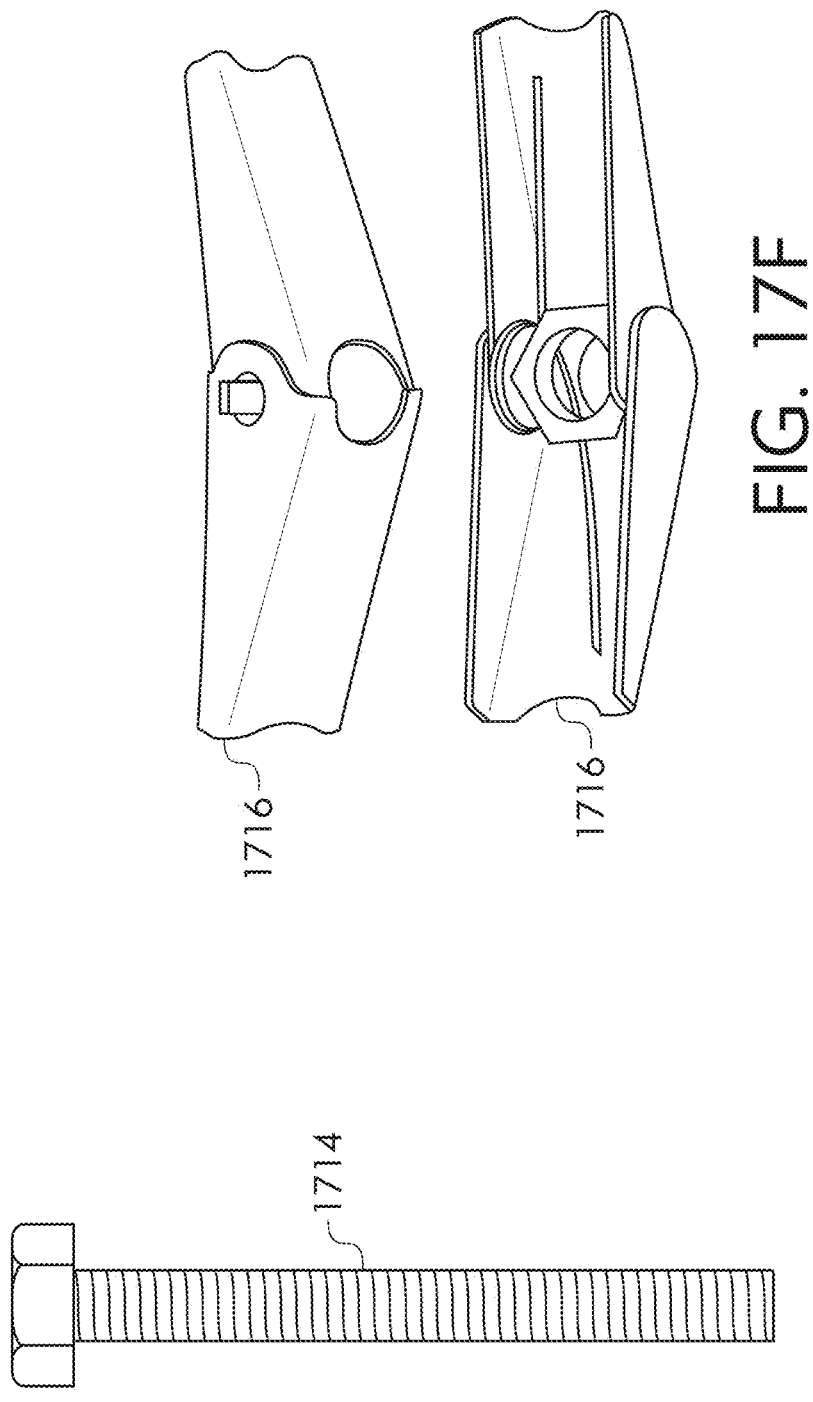

CONCENTRIC COUNTER-COIL TIE DOWN SYSTEM FOR QUICKLY SECURING OBJECTS

CROSS-REFERENCE TO RELATED APPLICATIONS

The present application claims priority to U.S. Provisional Application No. 62/173,213 filed Jun. 9, 2015, titled "CONCENTRIC COUNTER-COIL TIE DOWN SYSTEM FOR QUICKLY SECURING OBJECTS," which is hereby incorporated by reference in its entirety.

FIELD OF THE INVENTION

The field of the invention relates systems, methods and devices for quickly and easily securing movable objects using one or more concentric counter coil tie-downs.

BACKGROUND OF THE INVENTION

Various items and objects may move when transported, jostled or otherwise disturbed if not properly secured. Solutions have been created to tie cargo down securely and also to secure boats to fixed shore locations when docking including "O" rings, "D" rings, cleats and other traditional prior art tie downs. Bungee cords, tied ropes, buckles, ratchet straps and other means of securing items and objects have been used in the past. However, these means are often difficult to manipulate and can be easily loosened, even when used properly. Where buckles have been used, they frequently rub against cargo and may cause scratches, deformities and other damage. Thus, needs exist for simple, efficient and effective tie downs.

SUMMARY

Properly securing cargo, items and objects can be a lengthy process and may require significant human and mechanical strength in order to ensure the cargo, items and objects will not move during the course of transportation or fixing to a particular location. Military and non-military uses of securing means for items and objects can be beneficial in various contexts and industries such as: the transportation industry, marine contexts, storage industries, the oil industry, the construction industry, the medical industry, the mining or other heavy industrial industries, the aerospace and other space travel industries, home industries, recreational industries, the agriculture industry, the firearms industry, light and heavy commercial industries and various others. Particular examples of usage in some of these industries and contexts are as follows:

Transportation industry uses can including use with: semi-trucks, trailers, moving trucks, pickup trucks, automobiles, vans, cargo on ships, submarines or other vessels. Varied uses can include roof racks for vehicles and in-vehicle installations such as inside trunks, truck beds, semi-truck bodies, ship hulls or decks, Marine context uses can include use with: diving, mooring or otherwise securing boats, ships, submarines, tugboats, sailboats, speedboats, fishing boats or other vessels.

Storage industry usage in various contexts can include storage of cargo located on docks, container loading docks, piers, parking lots, trade show floors or other locations.

Home industry usage can include: pet tie downs, home storage use, plant hangers, landscaping or others.

Recreational industry usage in camping or other leisure time activities and can also include use in various sports such as mountain climbing, spelunking, canoeing, kayaking, hunting, birdwatching and others.

Agricultural industry usage can include: farming, livestock, ranching and others, and many other uses are contemplated. Many of these applications already have individual prior art means of securing items including various infrastructure.

Light and heavy commercial industry usage can include securing advertising balloons on a car lot, bicycle securing locations and various others.

Systems, methods and devices as described herein can be installed in locations adapted for various previous existing infrastructure with minimal or no modification. This makes the concepts and functions described herein ideal for use in a variety of environments and fields. They can also provide simplistic ways to secure items that requires minimal time and effort and that are highly effective, especially as compared with the deficiencies present in the prior art. Further, youths or small individuals can be as effective in securing items and objects as strong adult males based on application of the principles and teachings described herein and shown by way of example with respect to the various embodiments.

BRIEF DESCRIPTION OF THE DRAWING(S)

Illustrated in the accompanying drawing(s) is at least one of the best mode embodiments of the present invention. In such drawing(s):

FIG. 6B shows an example embodiment of a use case for a concentric counter coil tie-down assembly diagram from a side view.

FIG. 6C shows an example embodiment of a counter coil tie-down assembly diagram.

FIG. 13B shows an example embodiment of a concentric counter coil tie-down assembly with a plurality of mounting elements from a front perspective view.

FIG. 13F shows an example embodiment of a concentric counter coil tie-down assembly with a plurality of mounting elements from a front bottom-up perspective view.

FIGS. 17A-17F show an example embodiment diagram of a concentric counter coil tie-down assembly from various views.

DETAILED DESCRIPTION

Before the present subject matter is described in detail, it should be understood that this disclosure is not limited to the particular embodiments described, as such may vary. It should also be understood that the terminology used herein is for the purpose of describing particular embodiments only and is not intended to be limiting, since the scope of the present disclosure will be limited only by the appended claims.

Figure 1:
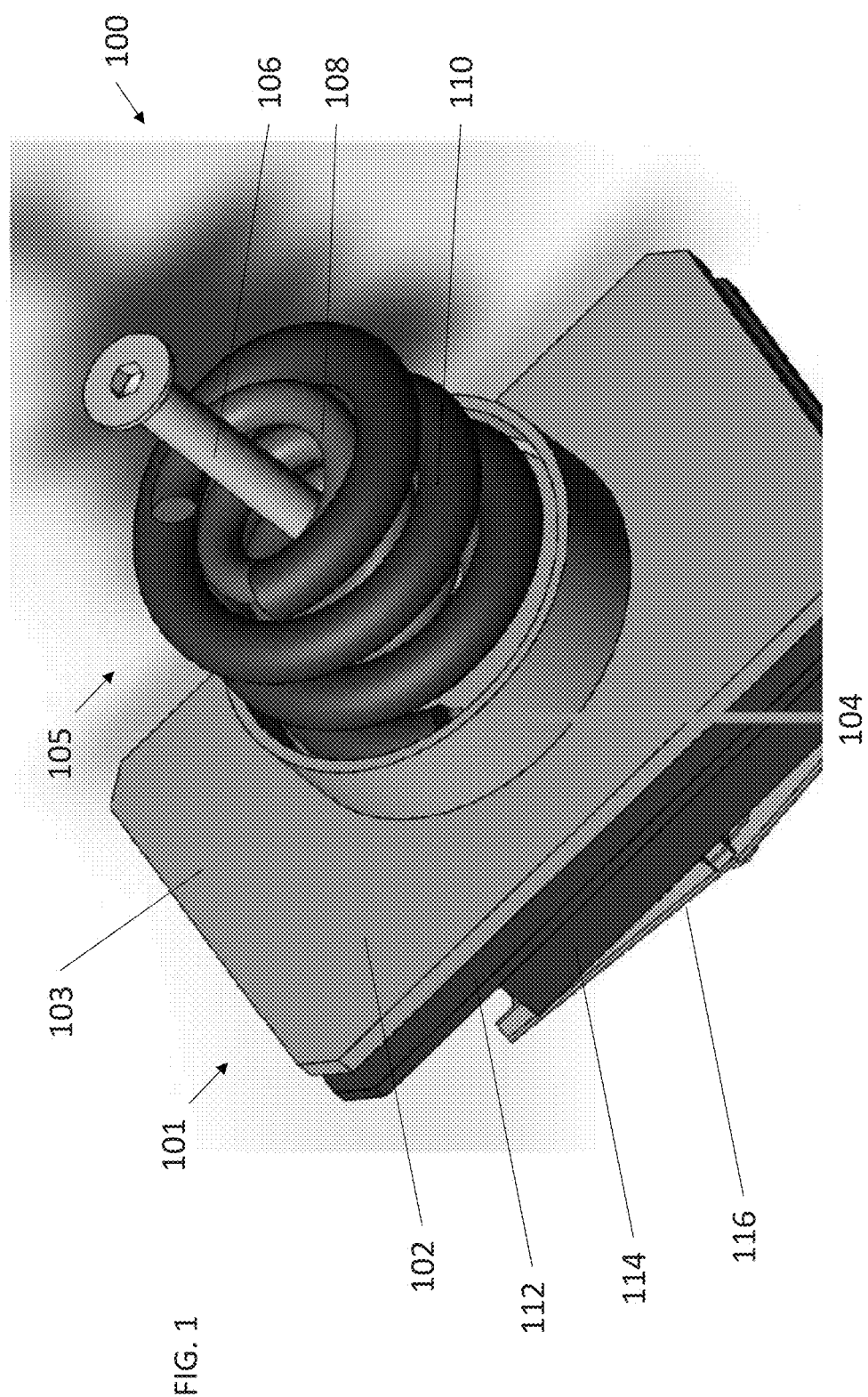
FIG. 1 shows an example embodiment of a concentric counter coil tie-down assembly from a perspective view.

FIG. 1 shows an example embodiment of a concentric counter coil tie-down assembly 100 from a perspective view. As shown in the example embodiment, concentric counter coil tie-down assembly 100 can include a mounting assembly area 101 and a concentric coil upper area 105.

A first coil 108 of concentric coil upper area 105 can be an interior coil and can be a right-handed helical coil that is coupled to a coil-side surface 103 of a base plate 102 of mounting assembly area 101 and that has a post 106 at its central axis. A second coil 110 of concentric coil upper area 105 can be an exterior coil and can be a left-handed helical coil that is coupled to coil-side surface 103 of base plate 102 and that has post 106 at its central axis. Second coil 110 can have a second radius from its central axis that is greater than that of the first radius of the first coil 108 to the central axis when viewed from a top down perspective, as shown and described with respect to FIG. 5.

Mounting assembly area 101 can include a base plate 102 that can be substantially planar, convex or concave in various embodiments. Base plate 102 can be rectangular, triangular, circular, oval or various other regular and irregular shapes and can be made of one or more varied materials such as metals, carbon fiber, plastics and others. Base plate 102 can include a raised cylindrical lower housing 104 with a central axis oriented perpendicular to base plate 102 at or near its center with a hollow interior. Raised cylindrical lower housing 104 can be removably or permanently coupled to first, coil-side surface 103 of base plate 102 such that it is monolithic or includes multiple components in various embodiments. Raised cylindrical lower housing 104 can have a third radius from its central axis that is greater than that of second radius of second coil 110.

Base plate 102 can also be permanently or removably coupled with post 106, located at the co-located central axes of lower housing 104, first coil 108 and second coil 110 and be oriented perpendicular to base plate 102. Post 106 can have a threaded screw-type lower section (not shown) that can be installed or otherwise coupled with an appropriately sized complementary hole (not shown) in base plate 102 that has complementary threading receiving grooves. In some embodiments the hole in base plate 102 and lower section of post 106 may not be threaded and post 106 can simply pass through the hole such that it extends through base plate 102.

Mounting assembly area 101 can include a first separator 112 that separates a second, mounting-side surface (not shown) of base plate 102, located opposite coil-side surface 103, from a mounting location that concentric coil upper area 105 is to be mounted to. First separator 112 can be substantially planar and have opposing first and second surfaces that serve to protect the mounting location from damage that could be caused by friction with mounting-side surface of base plate 102, including: scratching, denting, scraping and other damage.

In the example embodiment, concentric counter coil tie-down assembly 100 can be mounted to a substantially flat mounting location, such as a substantially planar piece of metal. As shown in the example embodiment, a second separator 114 can be substantially planar and have opposing first and second surfaces that serve protect an opposing surface of the mounting location from similar damage which could be caused due to friction with a clamp 116, such as a butterfly nut, of mounting assembly area 101 that is located adjacent the second surface of second separator 114. In the example embodiment, first and second separators 112, 114 are rubber and have holes for post 106 to pass through. In other embodiments they can be other materials or combinations of materials such as: foams, plastics and others. In some embodiments, clamp 116 can include receiving means such as a threaded hole for receiving a complementary threaded screwing end of post 106 for coupling.

Figure 2:
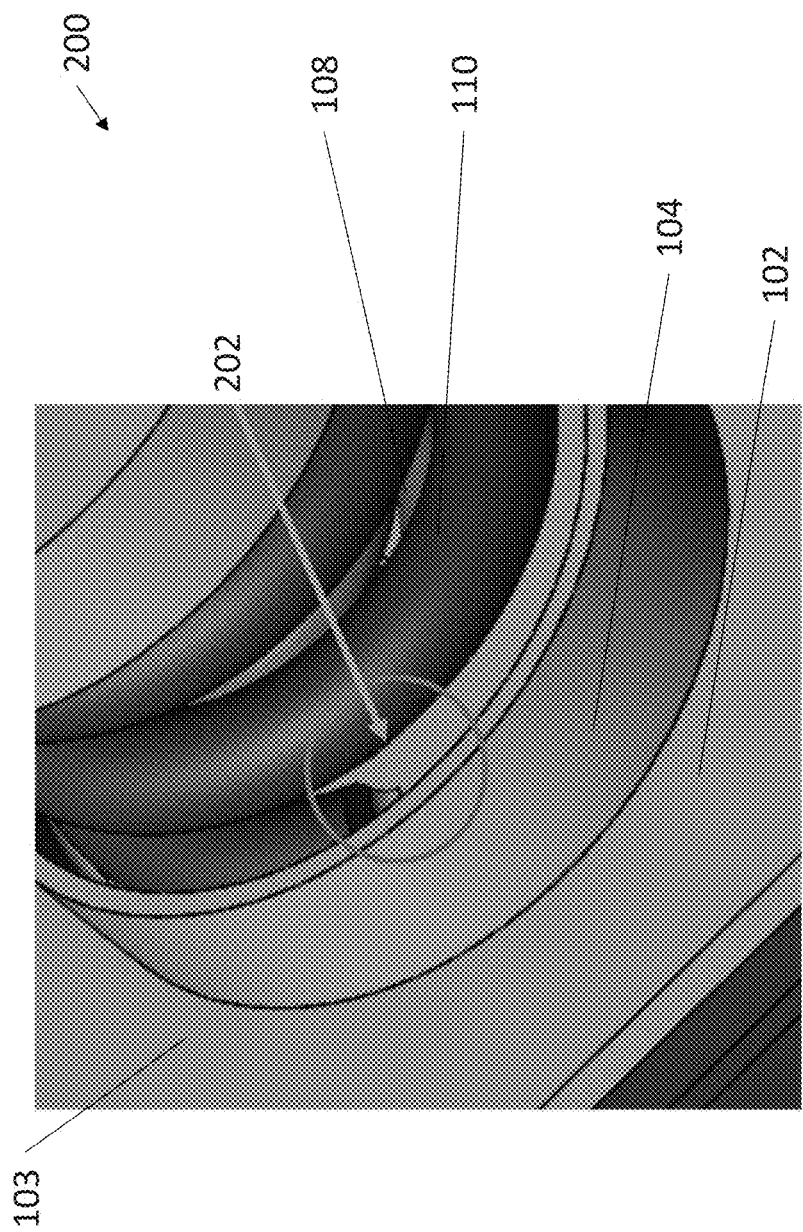
FIG. 2 shows an example embodiment of a close-up of a concentric counter coil tie-down assembly including a coupling to a base plate from a perspective view.

FIG. 2 shows an example embodiment of a close-up of a concentric counter coil tie-down assembly 200 including a coupling 202 of a second coil 110 to base plate 102 from a perspective view. In the example embodiment, one or both of first coil 108 and second coil 110 can be welded or otherwise permanently coupled to base plate 102 in an assembly manufacturing step. Typically, a manufacturer can weld first coil 108 to the first, coil-side surface 103 of base plate 102 in a desired position, location and orientation before welding second coil 110 to the first, coil-side surface 103 of base plate 102 a desired position, location and orientation. A portion of a first helical loop of first coil 108 and of second coil 110 can be flush with the first, coil-side surface 103 of base plate 102 surface such that a stable weld is created and forces against coils 108, 110 during use are distributed more evenly with respect to base plate 102 than if a single coil cross section is welded against the first, coil-side surface 103 of base plate 102.

Each of first coil 108 and second coil 110 can have a different cross section in the example embodiment. The cross section of first coil 108 can be smaller than the cross section of second coil 110. In other embodiments these dimensions can be switched or reversed. Alternatively, each coil can have equal cross sections. While the example embodiment shows circular cross sections for first coil 108 and second coil 110, in some embodiments cross sections can be oval, triangular, square, rectangular, pentagonal or other regular or irregular polygons. Additionally, coils can have ridges or other additional secondary structures that are not depicted in the FIGs. For instance, one or both coils 108, 110 can have a helical ridge around its exterior, perpendicular bars passing through and coupled to one or both coils 108, 110 to allow for additional knotting of ropes, nubs, hooks or others. Various other secondary structures are contemplated.

Figure 3:
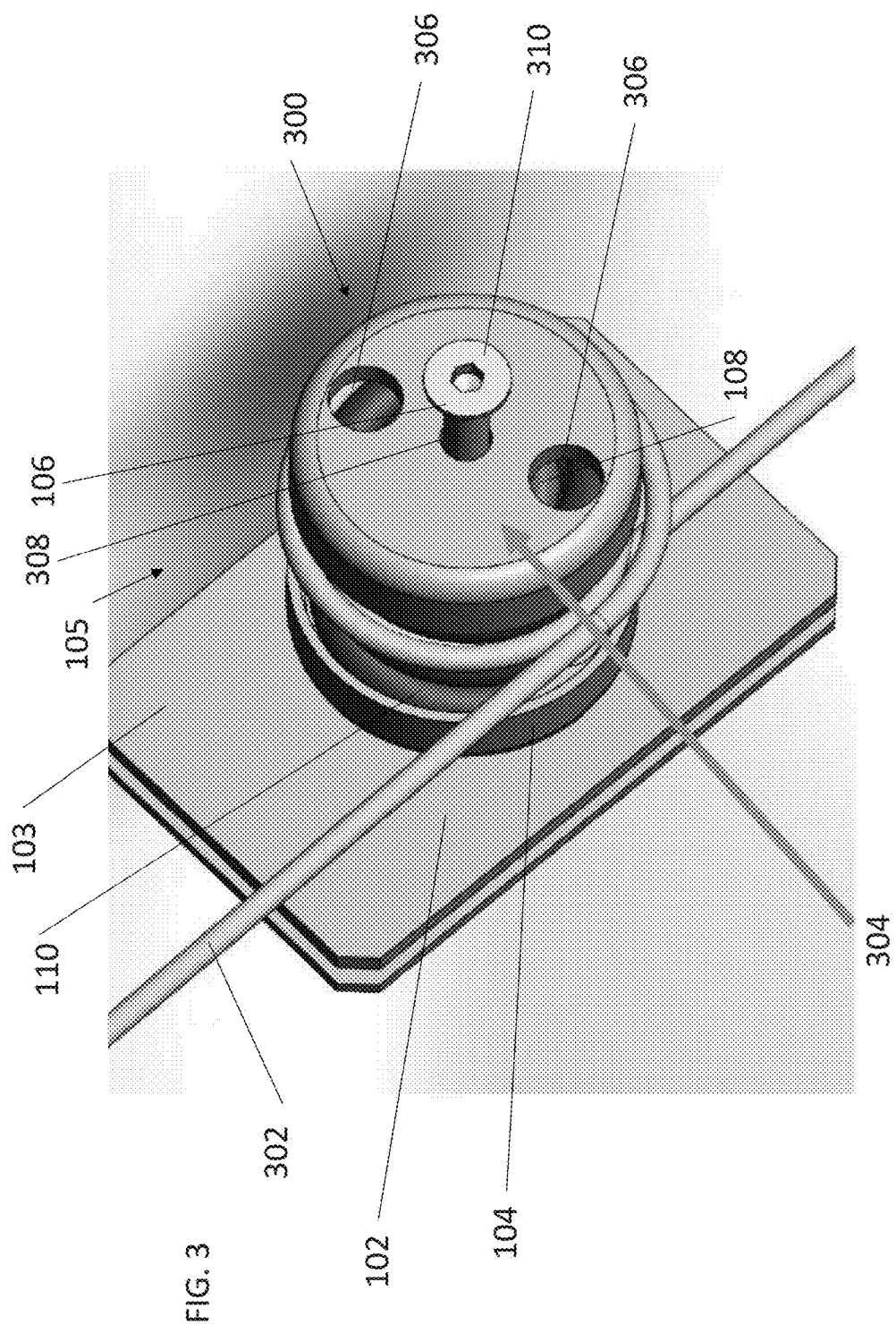
FIG. 3 shows an example embodiment of a concentric counter coil tie-down assembly with an elongate tie-down element from a perspective view.

FIG. 3 shows an example embodiment of a concentric counter coil tie-down assembly 300 with an elongate tie-down element 302 from a perspective view. As described elsewhere herein, in an example embodiment, one or more concentric counter coil tie-down assembly 300 can be installed or otherwise coupled to a mounting location to provide a tie-down securing location for various items and objects. As an example, with respect to FIGS. 7 and 12A-12E, concentric counter coil tie-down assembly 300 could be installed on the upper surface of one or more side-walls of the bed of a pickup truck and cargo in the bed of the pickup truck could be secured such that it will not move during transportation. As shown in the example embodiment of FIG. 3, a rope, cord, twine, strap, steel cable, chain or other such tie-down structure 302 which is attached or coupled to, placed or oriented over or around, or is otherwise associated with one or more cargo items or objects can be swiftly and easily wrapped once, twice or other numbers of times between gaps oriented circumferentially with respect to a first and second coils of concentric coil upper area 105 to secure the cargo to the mounting location. Removal of the rope, cord or other structure 302 can also be swiftly and easily accomplished by unwrapping from the concentric coil tie-down assembly 300.

Also shown in FIG. 3 is a cylindrical upper housing 304. Cylindrical upper housing 304 can have a centrally located hole 308 that post 106 can slidably or otherwise couple with. As shown, post 106 can include a head 310 that prevents cylindrical upper housing 304 from sliding free or otherwise decoupling from post 106. Cylindrical upper housing 304 can cover coils 108, 110 and can have the same radius and be coaxially located with raised cylindrical lower housing 104. One or more drainage holes 306 can allow water or other substances to pass through cylindrical upper housing 304. Similarly, in some embodiments drainage holes can allow water through cylindrical lower housing 104, base plate 102 or both.

Figure 4:
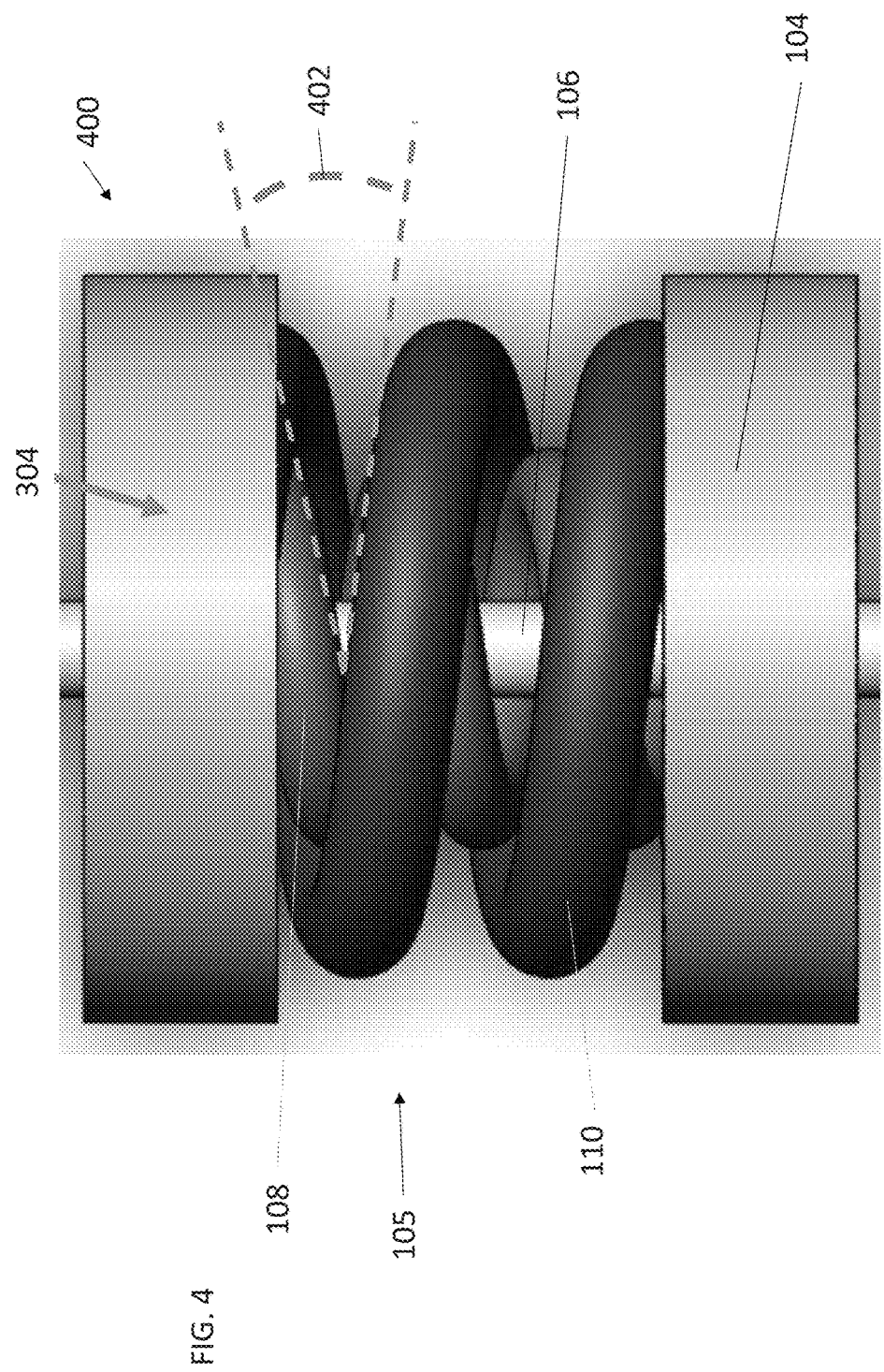
FIG. 4 shows an example embodiment of a concentric counter coil tie-down assembly from a side view.

FIG. 4 shows an example embodiment of a concentric counter coil tie-down assembly 400 from a side view. In various embodiments, first and second coils 108, 110 of concentric coil upper area 105 can have particular degrees of offset from each other and can have identical or different helical pitches, creating different orientations with different characteristics. These can create horizontal "V" shapes with differential angles 402 at various locations with respect cross sections of the coils 108, 110. These "V" sections can serve to secure ropes, cords or other structures by pinching the structures between loops of coils 108, 110. In the example embodiment, first and second coils 108, 110 of concentric coil upper area 105 can have a ninety degree offset from each other with a substantially identical helical pitch. In the example embodiment, the ninety degree offset creates about a twelve-degree differential angle 402 having a zero degree offset, creating a substantially horizontal "V" shape between cross sections of coils 108, 110.

Figure 5:
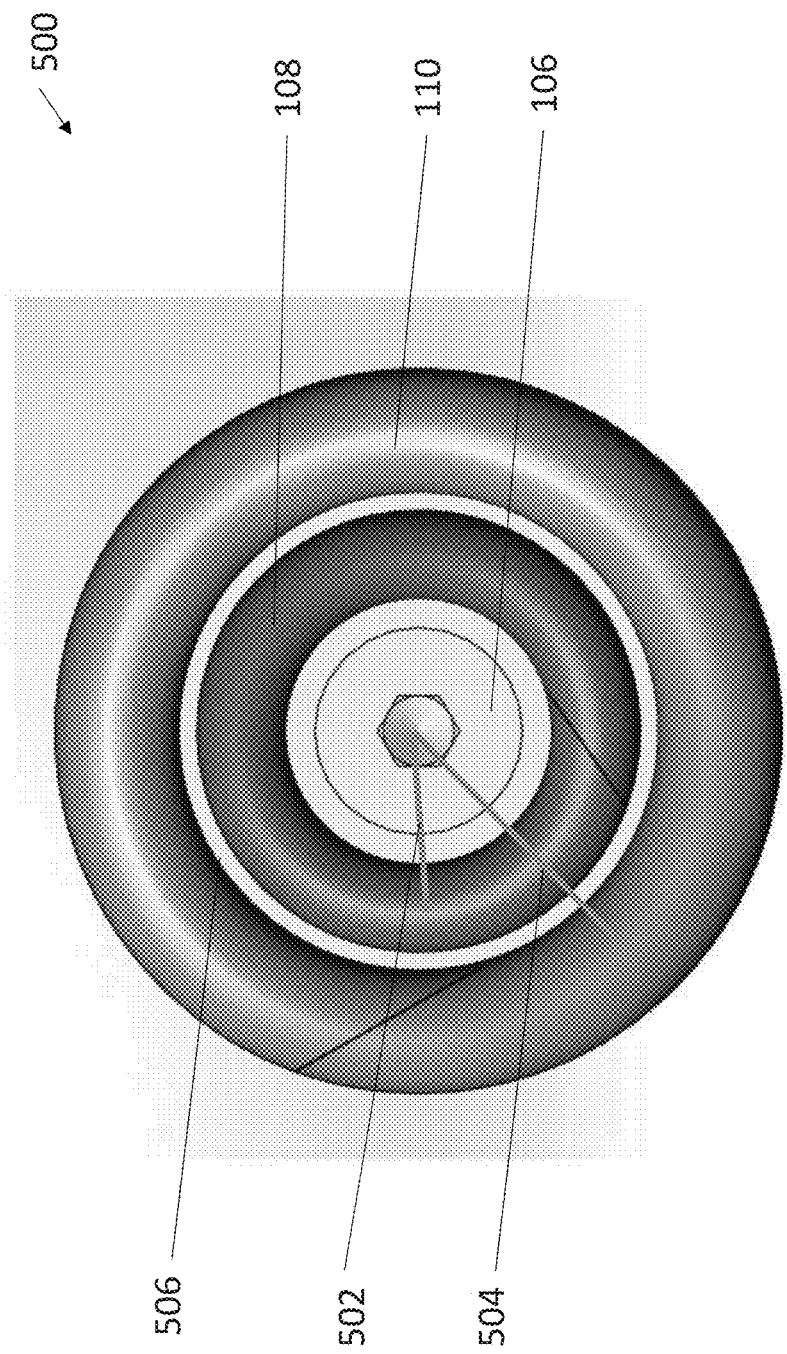
FIG. 5 shows an example embodiment of a concentric counter coil tie-down diagram from a top-down view.

FIG. 5 shows an example embodiment of a concentric counter coil tie-down diagram 500 from a top-down view. As shown in the example embodiment, post 106, first coil 108 and second coil 110 have are coaxially oriented. Various materials and combinations of materials can be used for each of these components, including: steel, plastic, polymers, carbon-fiber and other currently existing and future developed materials. While the example embodiment shows that both first coil 108 and second coil 110 are circular, one or both can also be different shapes when viewed from a top down perspective in different embodiments, such as: ovals, triangles, squares, rectangles, pentagons, stars, diamonds, or various other regular or irregular polygons or shapes. Central post 106 may or may not be included or required in some embodiments. Additionally, one or more posts can be included that are located exterior to second coil 110 in various embodiments. Also shown in the example embodiment, is a first coil radius 502 from a central axis and a second coil radius 504 from the central axis. In the example embodiment, first coil radius can be approximately 14 mm while second coil radius can be 504 can be approximately 20.5 mm with a gap 506 between coils of about 1 mm. In other embodiments, many different dimensions can be used.

Figure 6A:
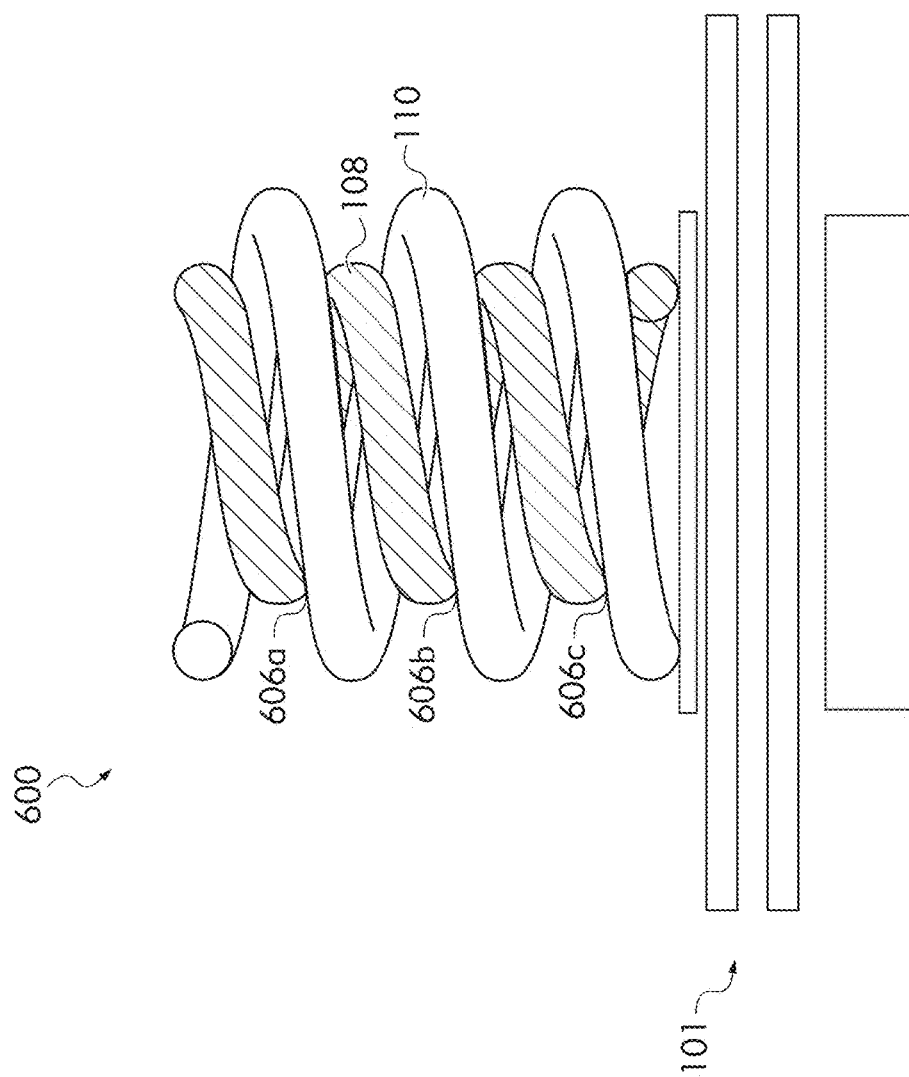
FIG. 6A shows an example embodiment of a counter coil tie-down assembly diagram having an inner coil and an outer coil.

FIG. 6A shows an example embodiment of a counter coil tie-down assembly diagram 600 having an inner coil 108 and an outer coil 110. In the example embodiment, horizontal gaps 606a-c between inner coil 108 and outer coil 110 can be about 12 degrees wide.

FIG. 6B shows an example embodiment of a use case for a concentric counter coil tie-down assembly diagram 600 from a side view. As shown in the example embodiment, concentric counter coil tie-down 600 can be mounted in a securing location using mounting assembly area 101 components. Then, a rope 602, which can be a 5 mm nylon rope in some embodiments, can be wrapped at least once between outer coil 110 and inner coil 108 by pulling one or both ends of the rope across a plane substantially perpendicular to a central axis of coils 110, 108. This can initially begin the securing of the rope 602 with respect to the concentric counter coil tie-down 600, before a user can then loop one or both ends of rope 602 around the concentric counter coil tie-down 600 a desired number of additional times to further secure the rope 602. Since the beginning movement is the initial securing of rope 602, additional loops can help to reinforce rope 602 and prevent slipping, withdrawal or other movement with respect to concentric counter coil tie-down 600 in order to secure it. In many embodiments, outer coil 110 and inner coil 108 can each have circular cross sections with no flat surfaces. Exterior surfaces (circumferential with respect to cross sections of the components) of outer coil 110 and inner coil 108 can be treated to increase their coefficient of static friction and reduce the chance of a rope accidentally loosening. Also, as shown in the example embodiment, upper and lower housings as shown with respect to FIG. 4 are not always required.

FIG. 6C shows an example embodiment of a counter coil tie-down assembly diagram 600. In the example embodiment, inner coil 108 and outer coil 110 are coupled to a mounting plate that is circular (not shown). The mounting plate, first and second separators 112, 114 and third spacer 604 are shown as uncoupled from each other in the example embodiment but are slidably coupled with bolt 106, which is coupled to clamp 116, a butterfly nut. Inner and outer coils 108, 110 have a height of about 25 mm in the example embodiment, while outer coil 110 has a diameter of about 41 mm. Mounting plate (not shown) can have about a 41 mm diameter and a 4 mm thickness and can be cylindrical in the example embodiment. First separator 112 can be about 90 mm by 57 mm by 3 mm, second separator 114 can be about 90 mm by 57 mm by 2 mm, third separator 604 can be about 51 mm by 65 mm by 15 mm and clamp 116 can be about 6 mm×80 mm. Mounting plate (not shown) can be chrome, first separator 112 can be chrome plated steel, second separator 114 can be a non-slip rubber protector and third separator 604 can be a rubber spacer that can snugly fit within a complementary sized hole in a pickup truck bed. Bolt 106 can be about 6 mm by 80 mm.

Figure 7:
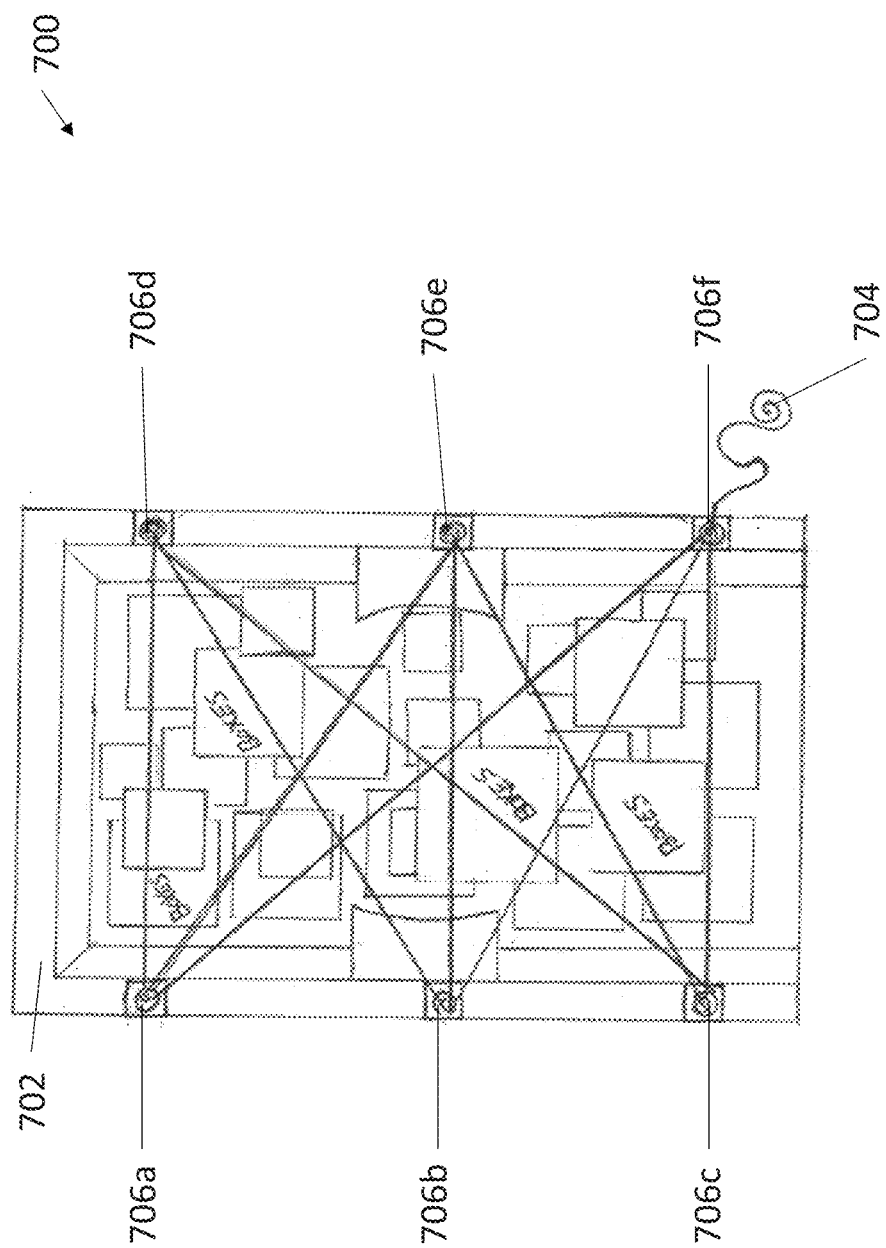
FIG. 7 shows an example embodiment of a truck bed installation diagram with a plurality of concentric counter coil tie-down assembly units installed from a top-down view.

FIG. 7 shows an example embodiment of a truck bed installation diagram 700 with a plurality of concentric counter coil tie-down assembly units 706a-f installed from a top-down view. In the example embodiment, the plurality of concentric counter coil tie-downs 706a-f can be installed at locations along the top sidewalls of truck bed 702. In other embodiments, various other installation locations can be used, such as on the floor surface of truck bed 702, raised from the side of truck bed 702, along a side wall of truck bed 702, along truck bed 702 walls, on an upper exterior surface of a wheel well, on a tailgate, or various other locations. Truck bed 702 can be loaded as is commonly performed for transporting boxes, sculptures, suitcases or other cargo, objects and items. A user can then quickly secure the cargo by wrapping rope 704 around at least one of the various concentric counter coil tie-downs 706a-f in the manner described above with respect to FIGS. 6A-C, where unsecured ends of rope 704 can be looped around the concentric coils and extend over, around and through cargo as appropriate. This can cause rope 704 to create a "web," similar to that seen in FIG. 7, preventing cargo from moving or flying out of truck bed 702.

Figure 8:
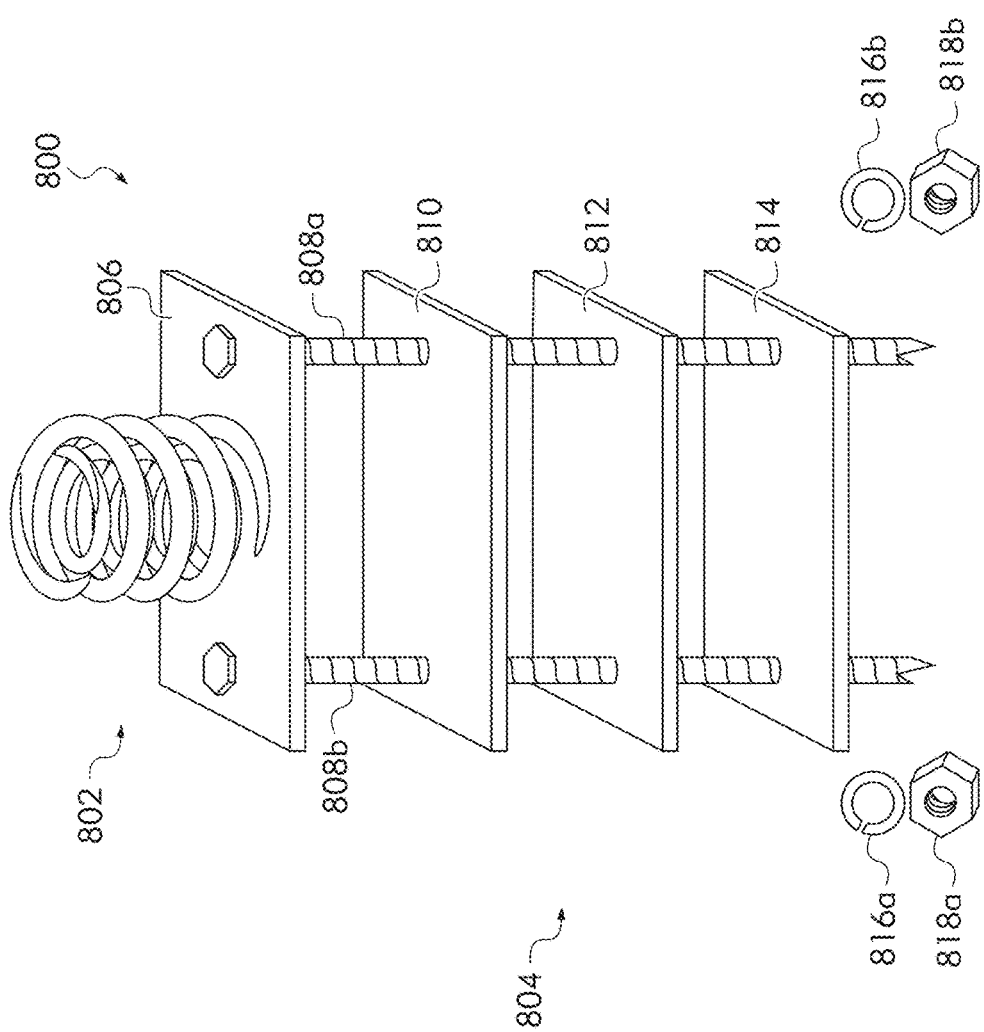
FIG. 8 shows an example embodiment of a concentric counter coil tie-down assembly diagram featuring a plurality of mounting elements which does not include a center post from a side perspective view.

FIG. 8 shows an example embodiment of a concentric counter coil tie-down assembly diagram 800 featuring a plurality of mounting elements which does not include a center post from a side perspective view. As shown, in various embodiments of the current apparatuses and systems, center posts may not be required to secure ropes. In the example embodiment a concentric counter coil upper section 802 can be coupled to a first mounting plate 806 with a plurality of pass-through holes, such as the two shown. The two pass-through holes can receive securing bolts 808a, 808b which can pass through complementary holes in a first protector 810 that can be non-slip rubber, a mounting location (not shown), a second protector 812 that can be non-slip rubber and a bottom plate 814 before being secured with optional locking washers 816a, 816b and locking nuts 818a, 818b. Bolts, locking nuts and locking washers can be triple chrome plated steel in some embodiments.

In the example embodiment, dimensions of each of first mounting plate 806, first protector 810, second protector 812 and bottom plate 814 can be about 75 mm by 50 mm by 4 mm. Dimensions of holes in each of these component can be sufficient to accommodate coupling with securing bolts 808a, 808b with dimensions of 6 mm by 60 mm and can be chrome. Locking nuts 818a, 818b can be triple chrome plated steel with nylon threads.

Figure 9:
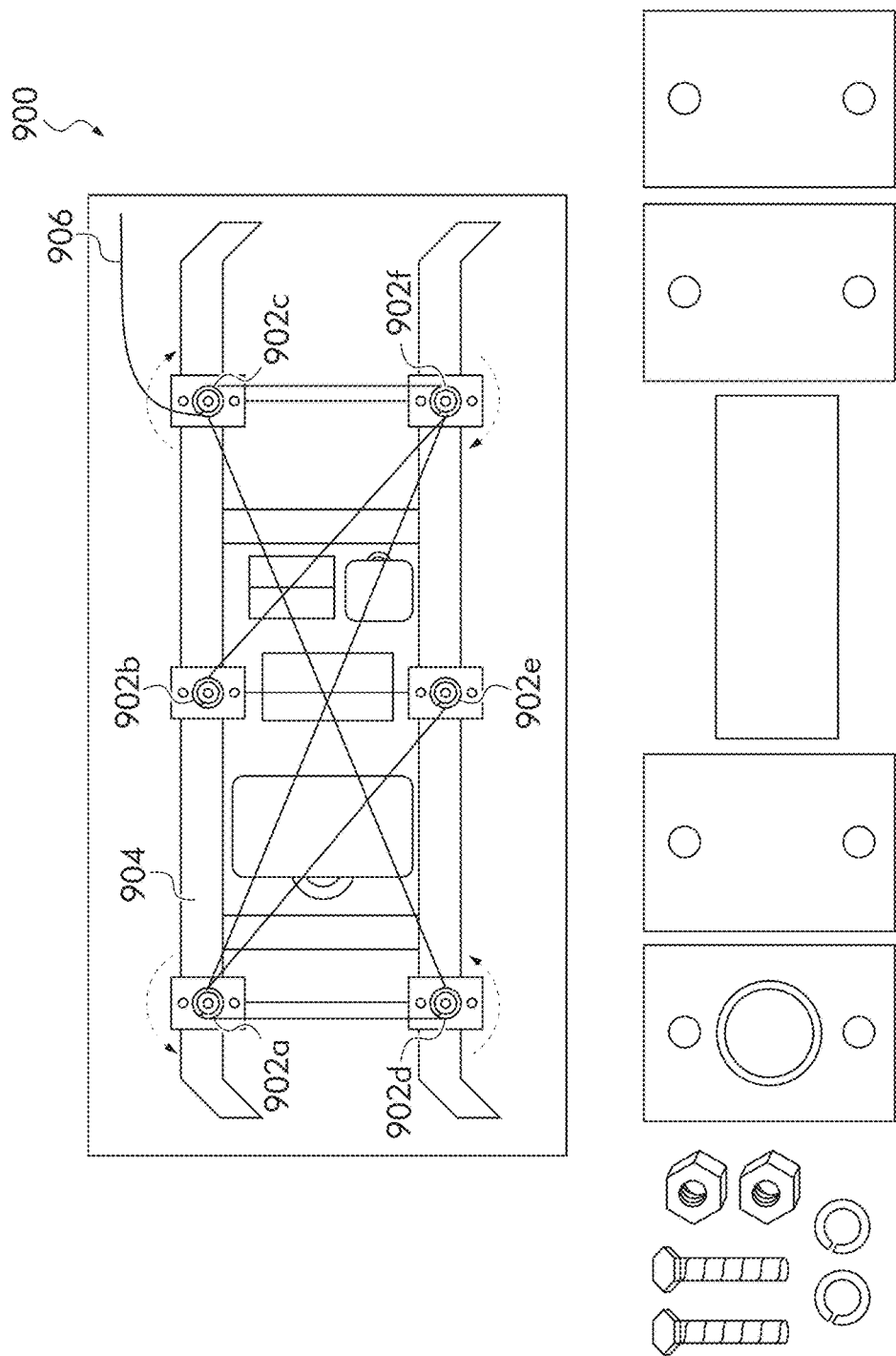
FIG. 9 shows an example embodiment of a vehicular roof-rack installation diagram including a plurality of concentric counter coil tie-down assembly units and various mounting parts from a top-down perspective view.

FIG. 9 shows an example embodiment of a vehicular roof-rack installation diagram 900 including a plurality of concentric counter coil tie-down assembly units 902a-f and various mounting parts from a top-down perspective view. In the example embodiment, similar to the description with regard to FIG. 7, a plurality of concentric counter coil assembly units such as the six assembly units 902a-f can be steel, triple chrome plated mounted to a vehicle roof rack 904 in order to assist in securing cargo. Boxes, suitcases, mattresses, and other cargo can be placed in an appropriate transporting location and rope 906 can be looped around concentric counter coil assembly units 902a-f in order to prevent or otherwise inhibit movement of the cargo during transportation. In the example embodiment shown, concentric counter-coil assembly mounts 902a-f can be dual mounts as shown and described with respect to FIG. 8.

Figure 10:
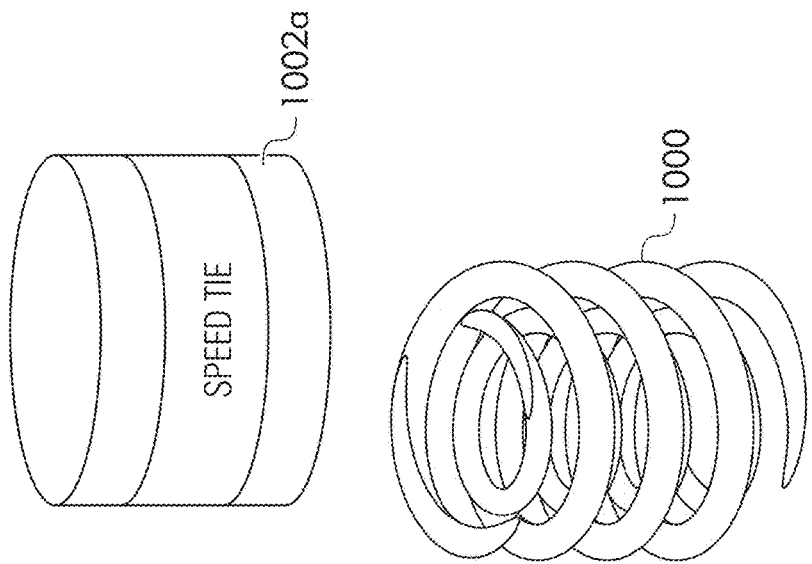
FIG. 10 shows an example embodiment diagram of a concentric counter coil tie-down and a plurality of concentric counter coil tie-down protective caps from a side perspective view.
Figure 10:
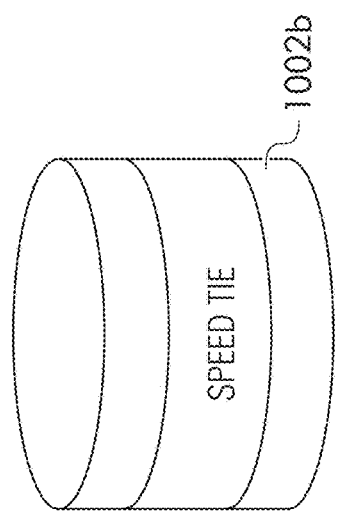

FIG. 10 shows an example embodiment diagram of a concentric counter coil tie-down unit 1000 and a plurality of concentric counter coil tie-down protective caps 1002a-b from a side perspective view. As shown in the example embodiment, protective caps 1002a-b can be cylindrical caps with an open end, a closed end and an inner diameter slightly larger than a maximum diameter of an exterior coil or an upper and lower housing of a concentric counter coil, such as concentric counter coil 1000. As such, they can snugly fit over, cover and protect the concentric counter coils from weather, unintentional contact or other damage. Protective caps 1002a-b can be made of any appropriate material including chrome steel, other metals, plastics, polymers, rubbers, treated wood or others. Additionally, protective caps 1002a-b can have an interior lining of rubber or other softer protective lining permanently or removably coupled to its exterior material, which can be metal, to further protect concentric counter coils and maintain a tight seal. In some embodiments, this can be a 1 mm rubber lining. Protective caps 1002a-b can have customizable outer surfaces which allow for display and changing of emblems, decals or other identifiers by users or sellers. In an example embodiment, protective caps can have dimensions of about 41 mm tall and 26 mm diameter with a 1 mm thick inner rubber lining.

Figure 11:
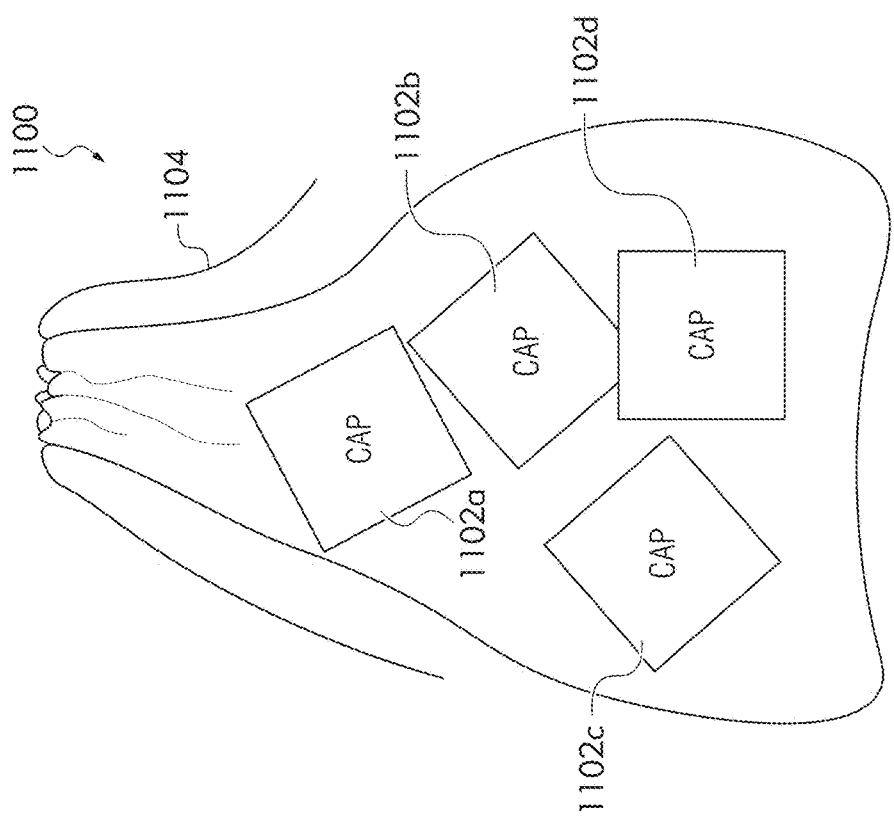
FIG. 11 shows an example embodiment diagram of a protective bag containing a plurality of concentric counter coil tie-down protective caps from a cutaway side view.
Figure 12A:
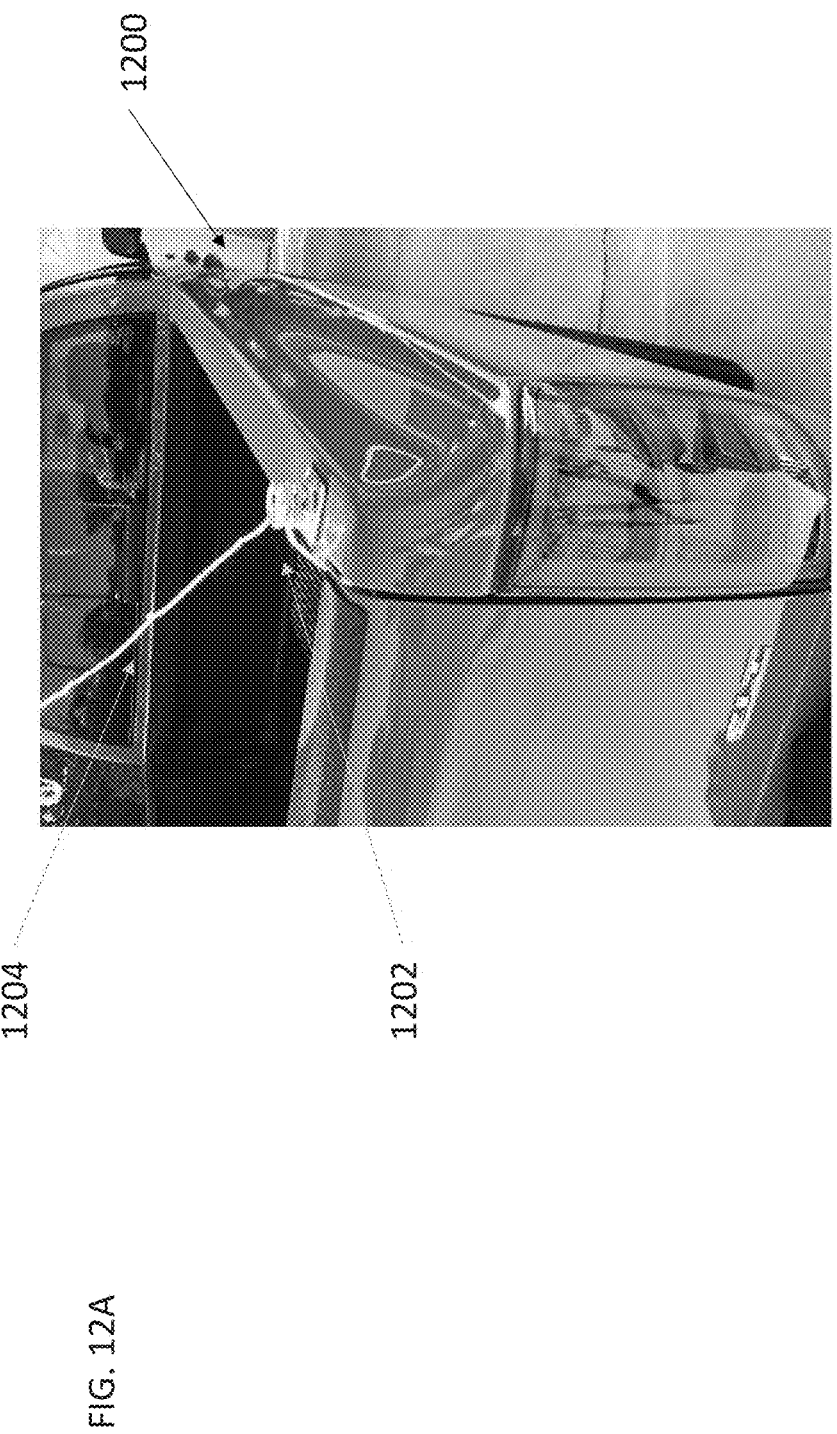
FIGS. 12A-12E show example embodiments of a concentric counter coil tie-down assembly installed on a pickup truck from varying distance perspective views.
Figure 12B:
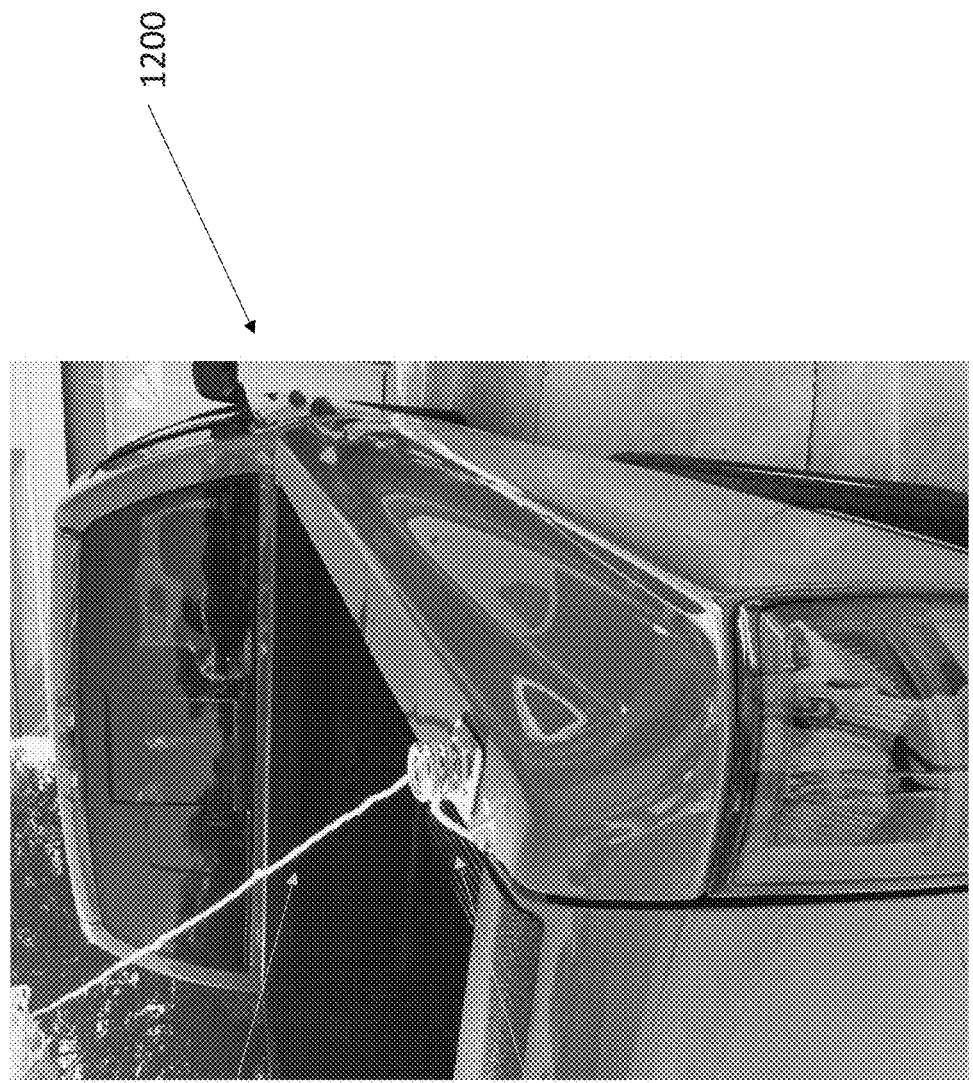
Figure 12C:
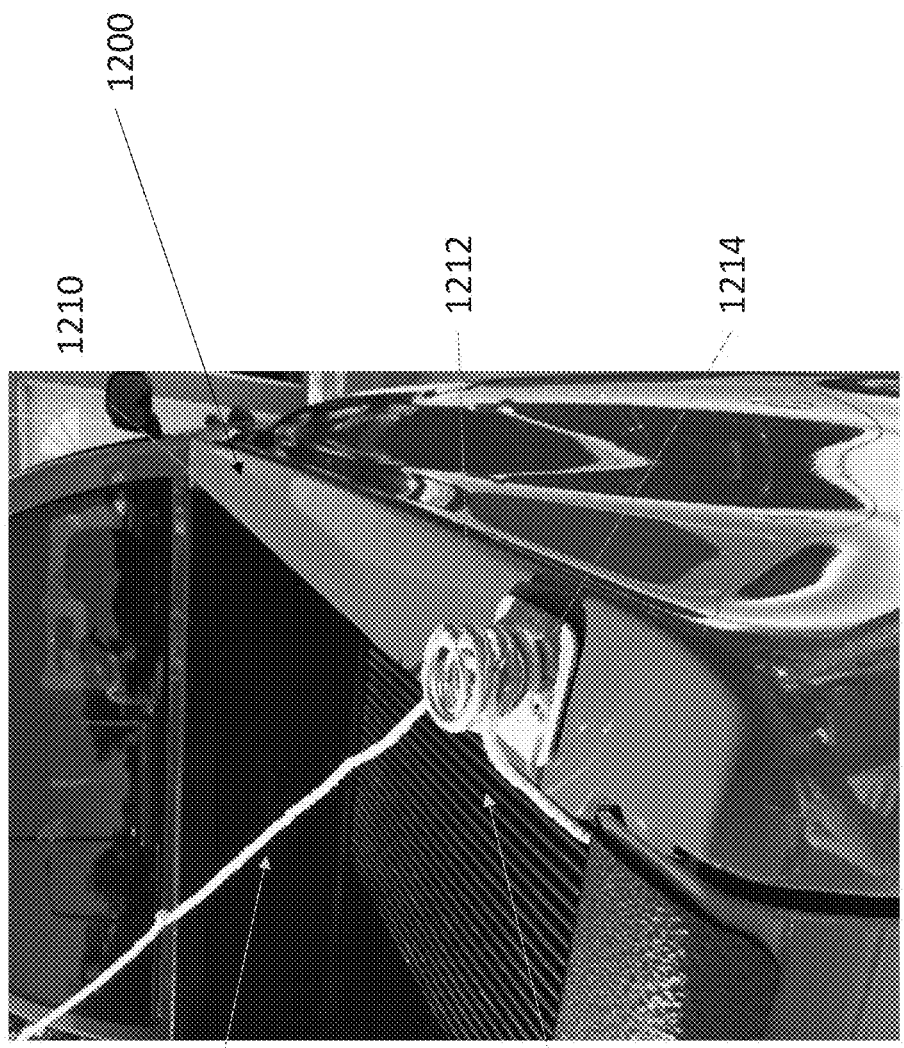
Figure 12D:
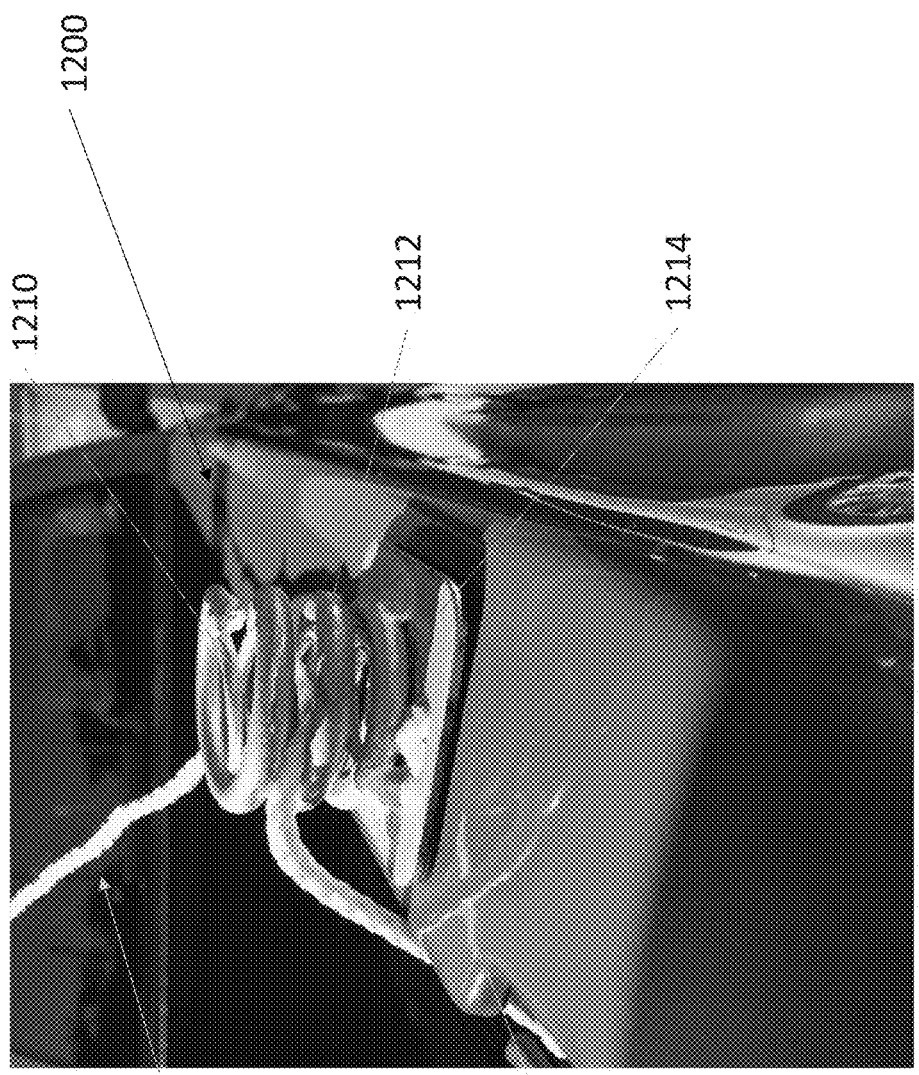
Figure 12E:
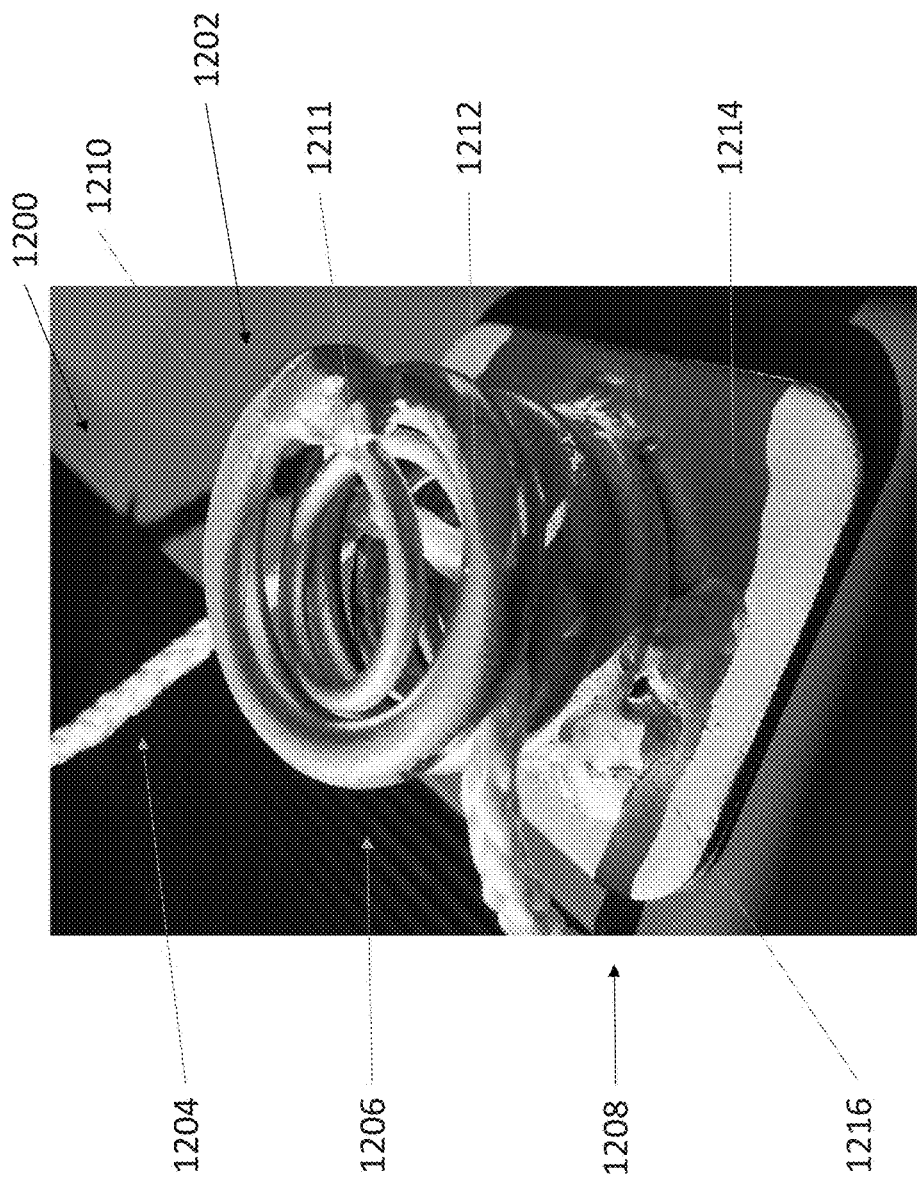

FIG. 11 shows an example embodiment diagram of a protective bag 1100 containing a plurality of concentric counter coil tie-down protective caps 1102a-d from a cut-away side view. In an example embodiment protective storage bag 1100 for protective caps 1102a-d can be provided for storage and safekeeping of protective caps 1102a-d when not installed on concentric coils. In some embodiments, protective storage bag 1100 can have two or more individual compartments. Protective storage bag 1100 can be made one or more of canvas, cloth, wool, polyester, or any other appropriate fabric or combination of fabrics. Also, as shown, a drawstring 1104 can be used to seal the bag for carrying. Any number of other additional accessories can be included or coupled with respect to appropriate locations of protective storage bag 1100, such as: handles, straps, viewing ports, body or shape maintaining elements such as flat or rounded surfaces, tool compartments and others, as are known in the art. Protective bag 1100 can be sized differently in various embodiments but in the example embodiment it can be about 120 mm by 100 mm by 100 mm and can be canvas for storing protective caps 1102a-d having dimensions of about 41.5 mm by 26 mm by 1 mm with 1 mm inner rubber lining. This size allows for storage in a glove box or other small compartment in a vehicle.

FIGS. 12A-12E show example embodiments of a concentric counter coil tie-down assembly 1202 installed on a pickup truck 1200 from varying distance perspective views. In the example embodiments, the concentric counter coil tie-down installation 1202 is installed on an upper surface of a side-rail of a pickup truck bed. As shown, upper coil area 1206 includes a first, inner helical coil 1210 and a second, outer helical coil 1212 oriented opposite each other. In the example embodiment upper ends of first coil 1210 and second coil 1212 are permanently coupled by a welding 1211. Upper coil area 1206 components are permanently coupled to lower mounting area 1208, as shown by weld 1216 between second coil 1212 and mounting plate 1214. Also shown is a cord 1204 that can be looped in a horizontal fashion through installation 1202 in order to secure items with respect to installation 1202.

FIGS. 13A-13F show an example embodiment of a concentric counter coil tie-down assembly 1300 with a plurality of mounting elements from various views.

Figure 13A:
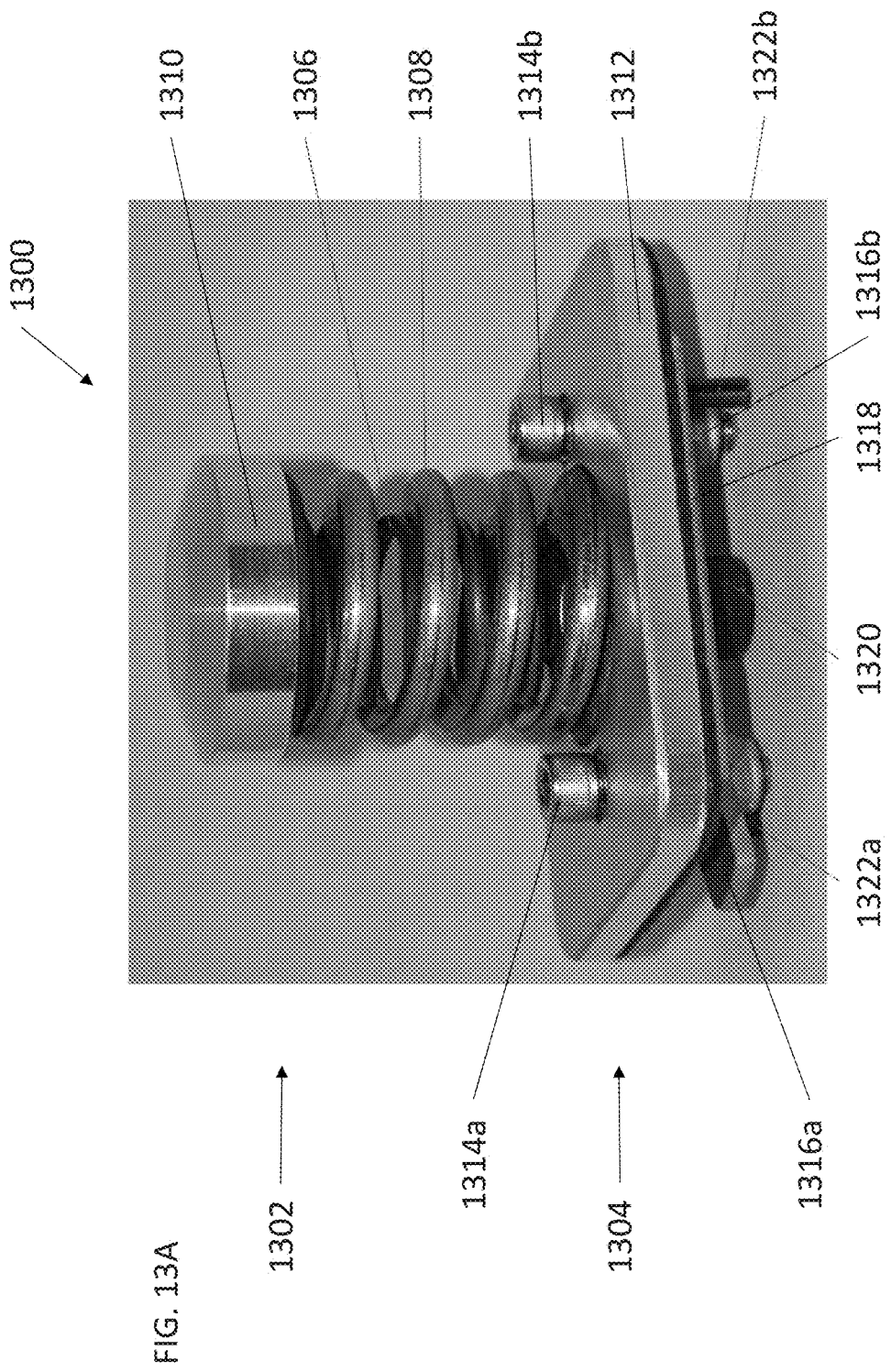
FIG. 13A shows an example embodiment of a concentric counter coil tie-down assembly with a plurality of mounting elements from an oblique side-perspective view.

FIG. 13A shows an example embodiment of a concentric counter coil tie-down assembly 1300 with a plurality of mounting elements from an oblique side-perspective view. In the example embodiment, assembly 1300 includes an upper section 1302 and a lower section 1304. As shown in the example embodiment, upper section can include a cap 1310, an inner coil 1306 and an outer coil 1308. Inner and outer coils 1306, 1308 can be coupled with cap 1310.

Figure 13C:
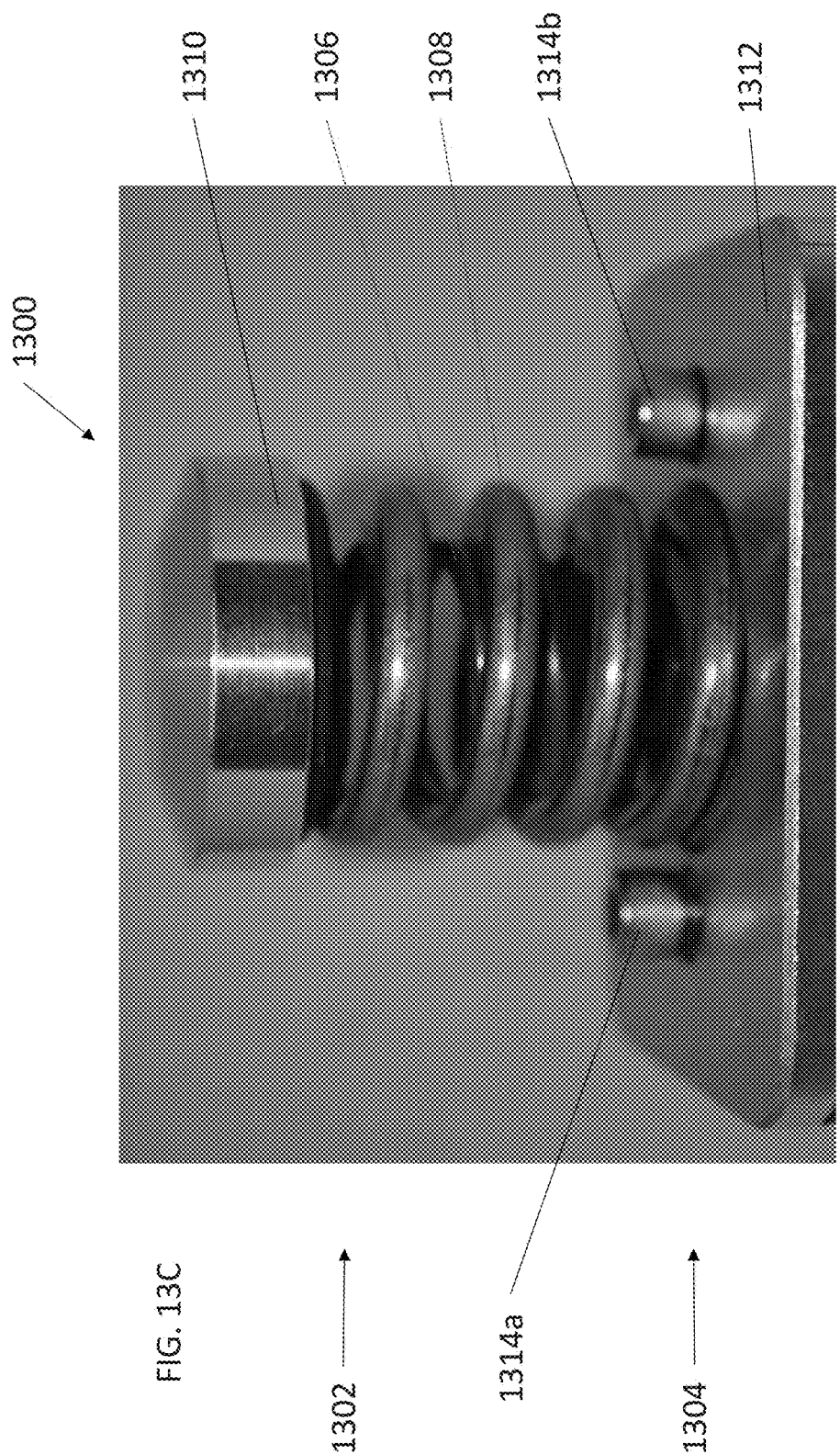
FIG. 13C shows an example embodiment of a concentric counter coil tie-down assembly with a plurality of mounting elements from a close-up front perspective view.
Figure 13D:
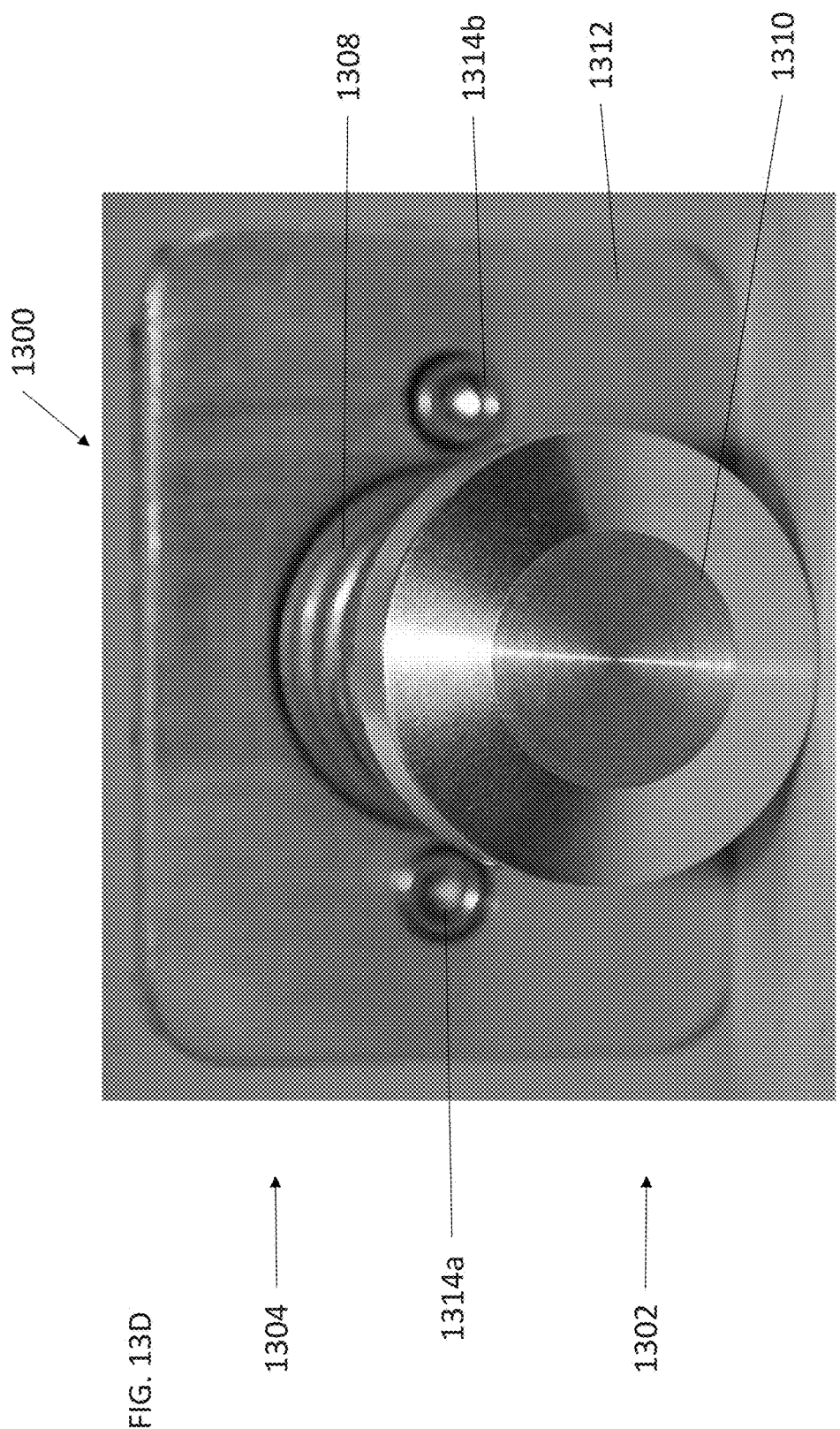
FIG. 13D shows an example embodiment of a concentric counter coil tie-down assembly with a plurality of mounting elements from a top-down perspective view.
Figure 13E:
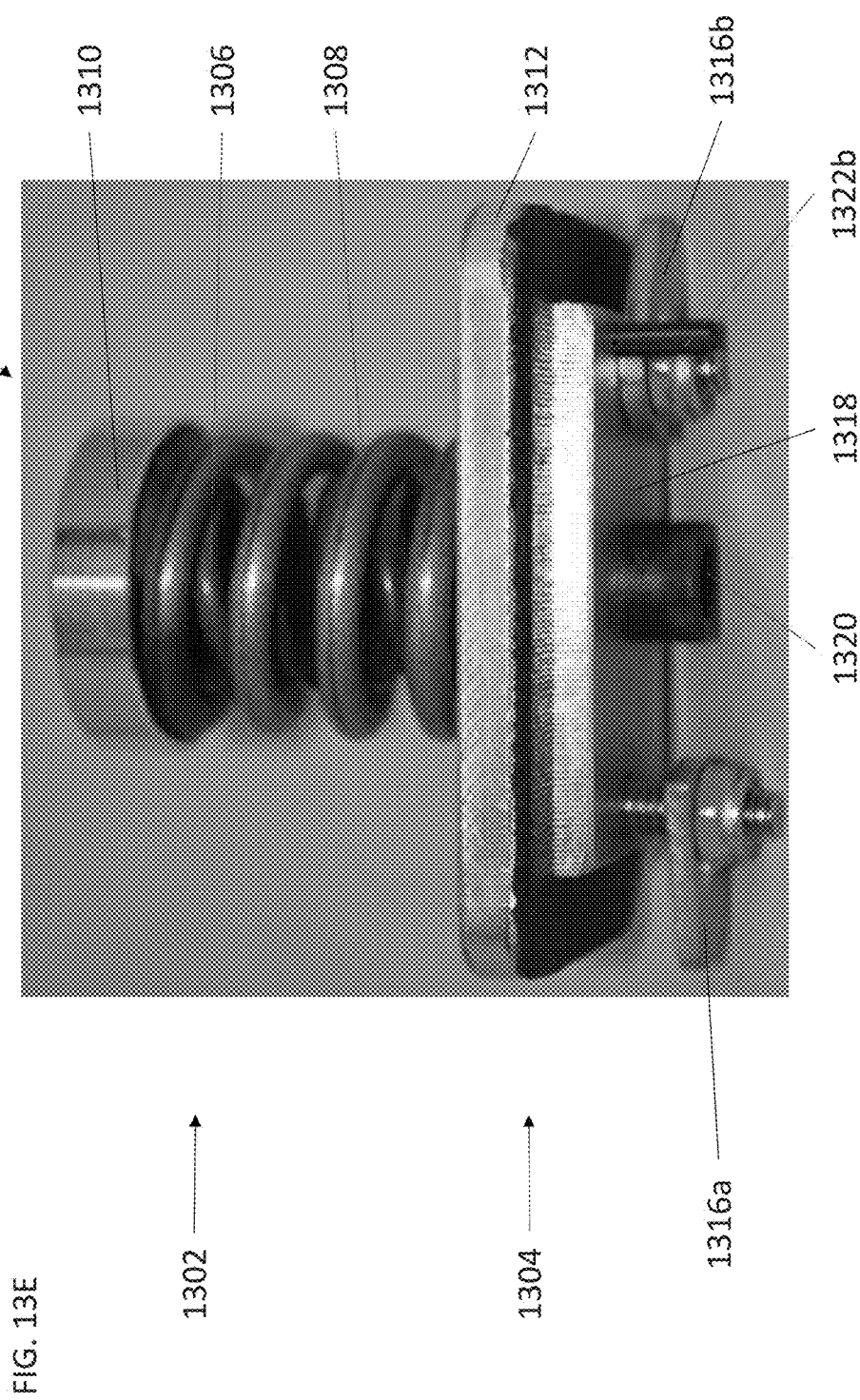
FIG. 13E shows an example embodiment of a concentric counter coil tie-down assembly with a plurality of mounting elements from a front bottom-up perspective view.

As also shown in the example embodiment, inner and outer coils 1306, 1308 can be coupled with lower section 1304, as described with respect to FIG. 13E. Lower section 1304 can include a mounting plate 1312 and one or a plurality of mounting screws 1314a, 1314b that pass through threaded or unthreaded holes in a mounting plate 1312 and a seal 1318. Mounting plate 1312 and seal 1318 can be permanently or removably coupled in various embodiments.

Mounting screws 1314a, 1314b can be thumbscrews, having upper gripping elements, such as ridges, that can quickly and easily be adjusted by hand by a user without the need for any tools in the example embodiment. However, in some embodiments, mounting screws 1314a, 1314b can be different types of screws that require screwdrivers, wrenches or other tools. Mounting screws 1314a, 1314b are threaded such that they can be coupled with mounting nuts 1316a, 1316b respectively. As shown, mounting nuts 1316a, 1316b include arms such that they can be gripped by a user's fingers and not require additional tools to hold while adjusting.

In the embodiment shown, two posts 1322a and 1322b can be used to prevent the arms of mounting nuts 1316a, 1316b from rotating a full 360 degrees around mounting screws 1314a, 1314b when rotatably coupling in embodiments where they have complementary proportions. As such, posts 1322a, 1322b can stop mounting nuts 1316a, 1316b in a desired position to allow mounting nuts 1316a, 1316b and mounting screws 1314a, 1314b to tighten and secure concentric counter-coil installation 1300 with respect to an installation location, such as on a surface of a truck bed as a user rotates mounting screws 1314a, 1314b by hand, with a screwdriver, hex connector, wrench or other implement or tool. As the user rotates mounting screws 1314a, 1314b, mounting nuts 1316a, 1316b rotate into the desired position and contacts posts 1322a, 1322b, which act as a stopping element. Then, as a user tightens them with respect to each other, mounting nuts 1316a, 1316b can move upward with respect to seal 1318; seal 1318 can move downward with respect to mounting nuts 1316a, 1316b; or both can occur. Seal 1318 can be a rubber protector mount below mounting plate 1312 and can be complementary sized with a rectangular or other shaped opening of a truck bed wall or surface, such that it snugly fits within the opening. In various embodiments, these openings in the truck bed surface can be standard sized across trucks of a manufacturer product line, across the industry or custom created.

FIG. 13B shows an example embodiment of a concentric counter coil tie-down assembly 1300 with a plurality of mounting elements from a front perspective view.

FIG. 13C shows an example embodiment of a concentric counter coil tie-down assembly 1300 with a plurality of mounting elements from a close-up front perspective view.

FIG. 13D shows an example embodiment of a concentric counter coil tie-down assembly 1300 with a plurality of mounting elements from a top-down perspective view.

FIG. 13E shows an example embodiment of a concentric counter coil tie-down assembly 1300 with a plurality of mounting elements from a front bottom-up perspective view. As shown in the example embodiment, mounting plate 1312 can be permanently or removably coupled with secondary mounting plate 1318 that can have a smaller perimeter than mounting plate 1312. This can provide a snug fit into a complementary sized hole or depression in a mounting location such that some or all of mounting plate 1312 rests above a portion of the mounting location while secondary mounting plate 1318 rests at least partially within the hole or depression of the mounting location. Lower protrusion 1320 can be a base coil bolt coupling for coupling with a post (obscured) (see, e.g. post 106 of FIG. 1) of upper section 1302 such that it can bolt or otherwise couple the upper section 1302 of concentric coil tie down assembly 1300 to mounting plate 1312 of lower section 1304 of concentric coil tie down assembly 1300. In various embodiments, lower protrusion 1320 can be used to removably couple upper section 1302 to one of a variety of lower sections, which can be uniquely shaped based on the particular requirements of different desired mounting locations.

FIG. 13F shows an example embodiment of a concentric counter coil tie-down assembly with a plurality of mounting elements from a front bottom-up perspective view.

Figure 13G:
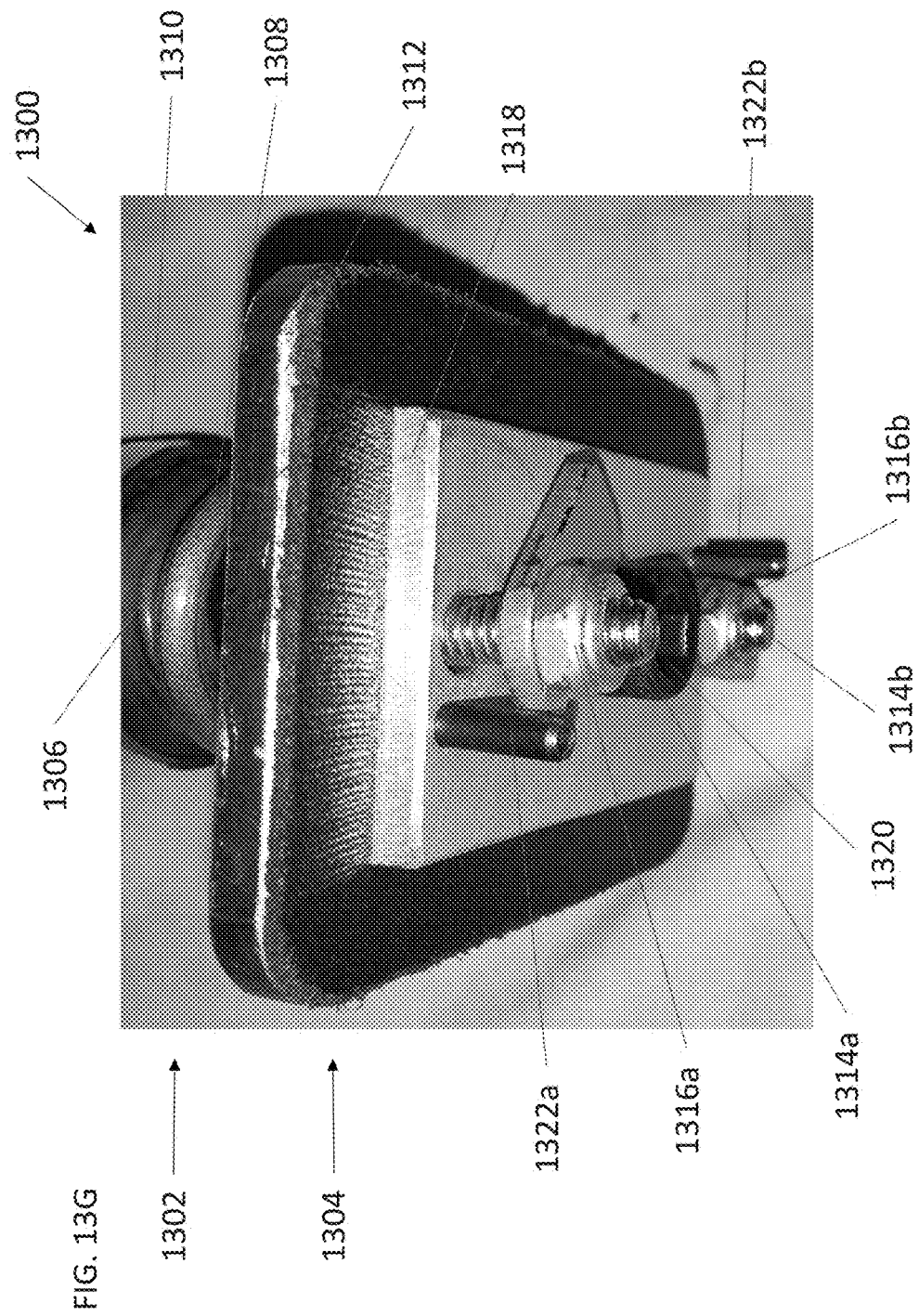
FIG. 13G shows an example embodiment of a concentric counter coil tie-down assembly with a plurality of mounting elements from a front bottom-up side perspective view.

FIG. 13G shows an example embodiment of a concentric counter coil tie-down assembly with a plurality of mounting elements from a front bottom-up side perspective view.

Figure 13H:
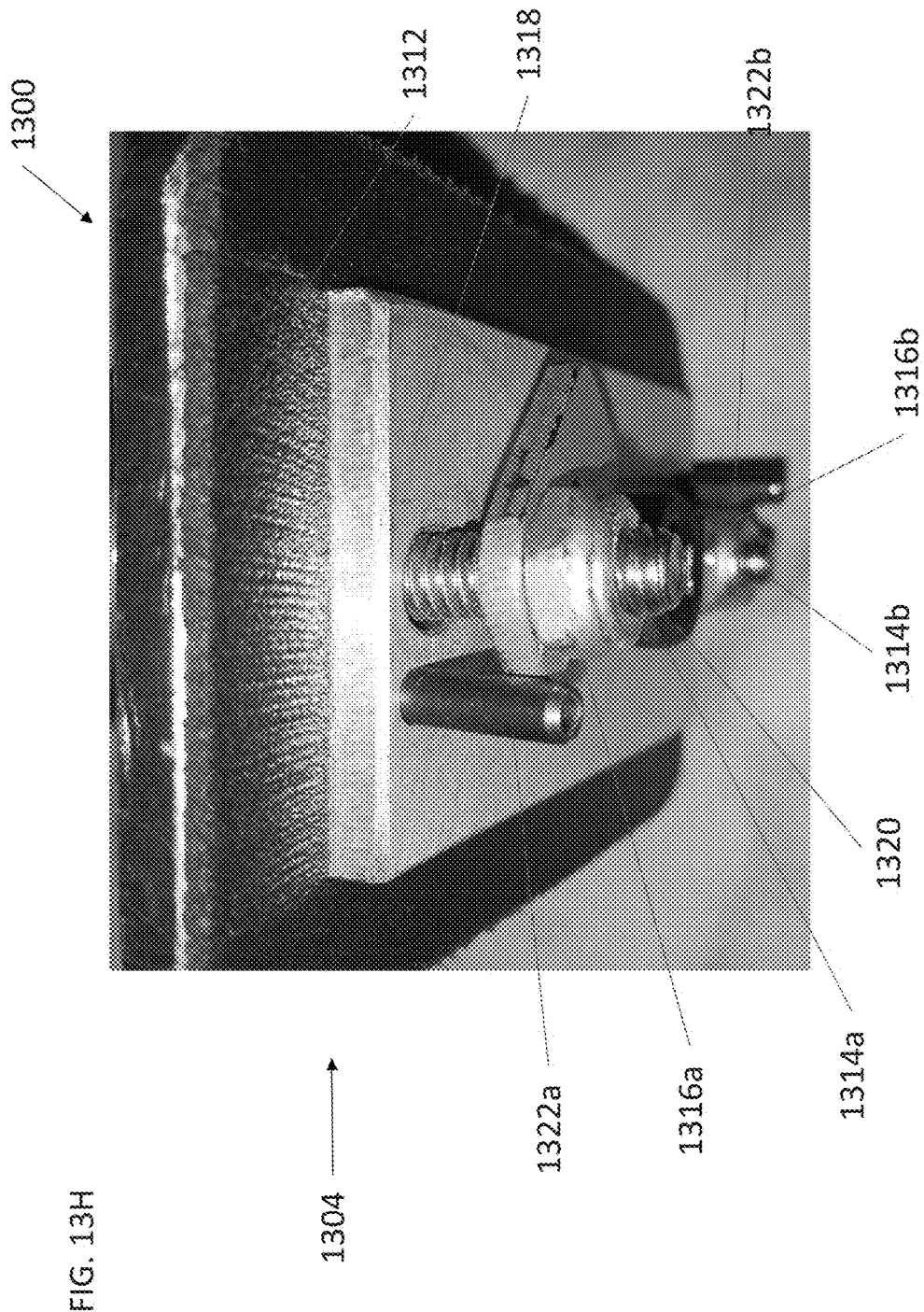
FIG. 13H shows an example embodiment of a concentric counter coil tie-down assembly with a plurality of mounting elements from a front bottom-up side perspective view.

FIG. 13H shows an example embodiment of a concentric counter coil tie-down assembly with a plurality of mounting elements from a front bottom-up side perspective view.

Figure 14A:
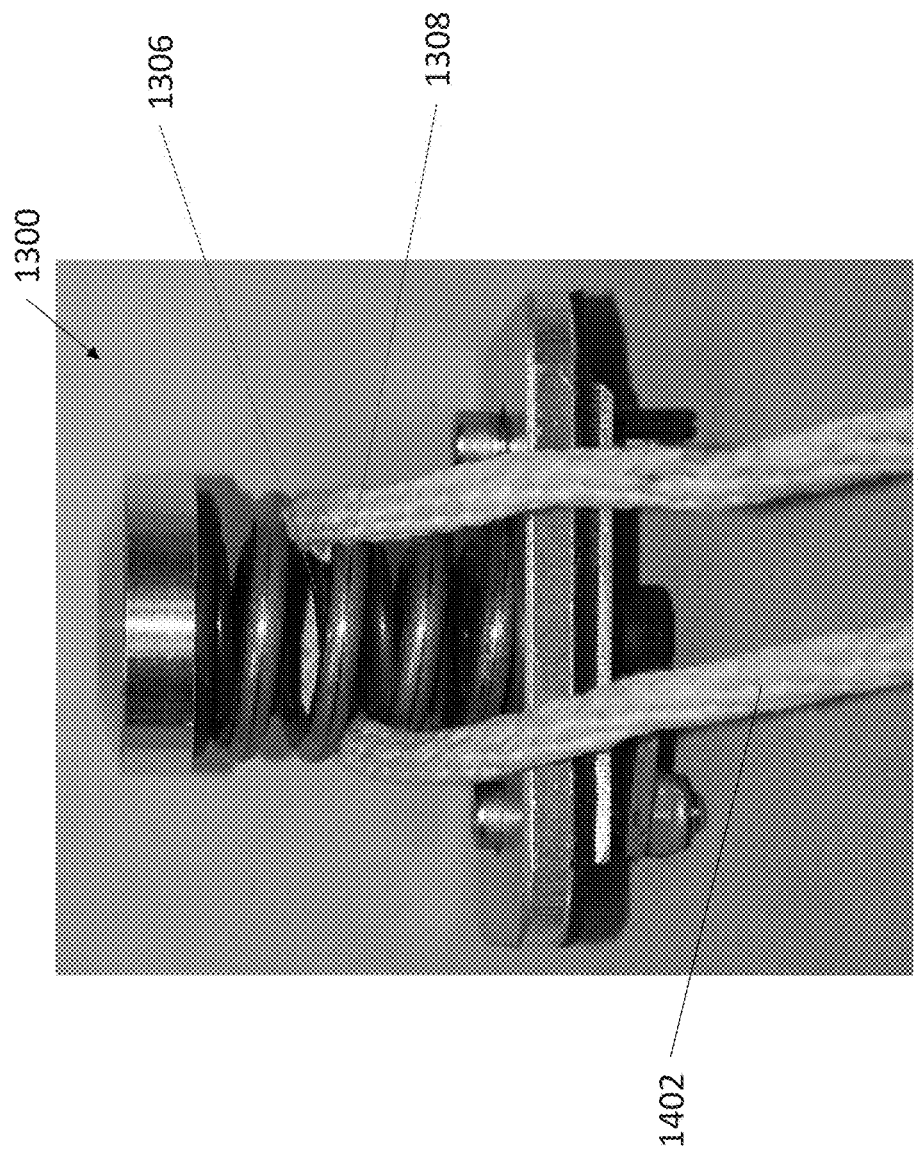
FIGS. 14A-14C show example embodiments of a concentric counter coil tie-down assembly with a plurality of mounting elements and an elongate tie-down element from varying distance front perspective views.
Figure 14B:
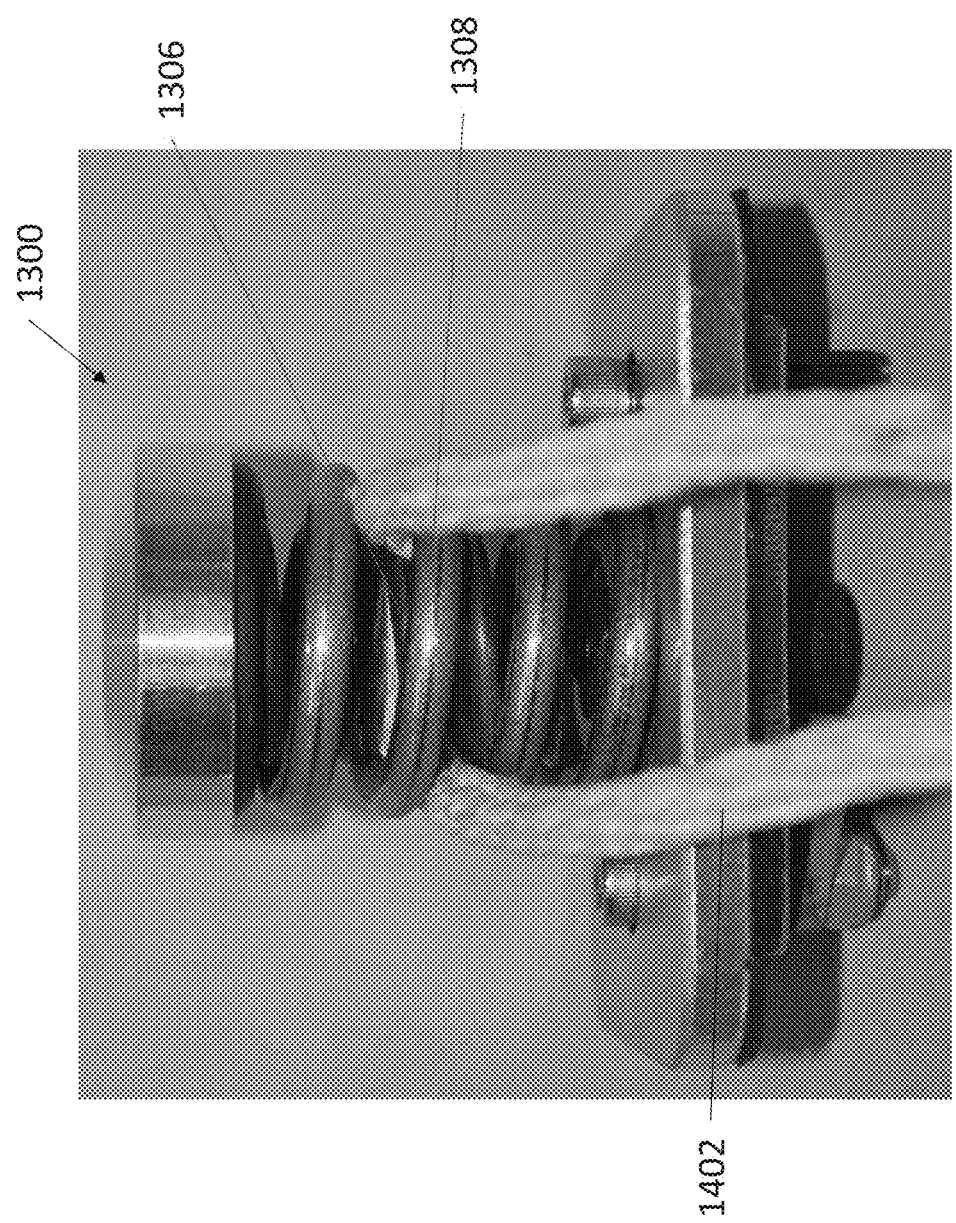
Figure 14C:
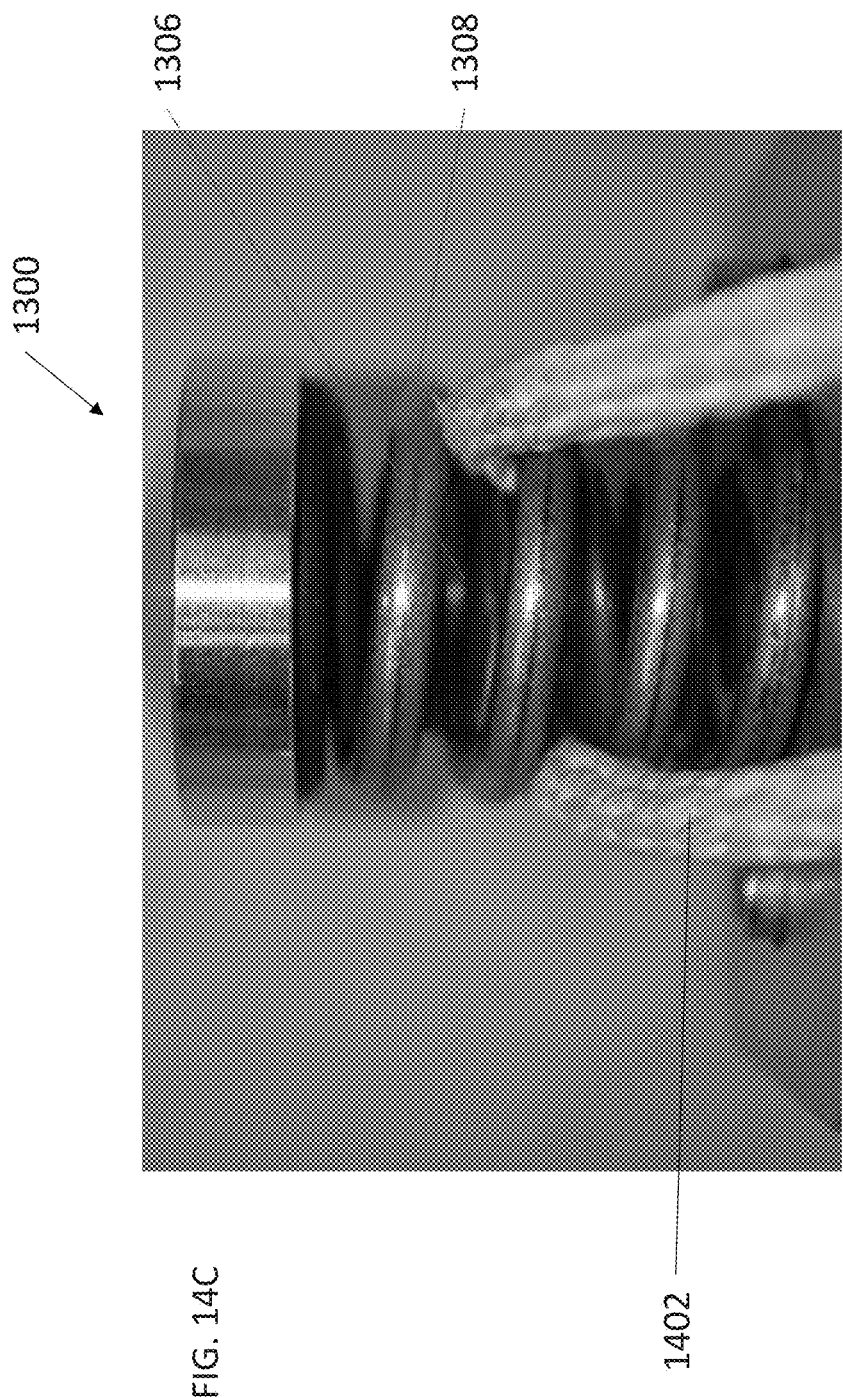

FIGS. 14A-C show example embodiments of a concentric counter coil tie-down assembly 1300 with a plurality of mounting elements and an elongate tie-down element 1402 at varying distances from front perspective views. As shown in the example embodiments and described elsewhere herein, in order to secure items and objects, an assembly 1300 user can tightly pull an appropriately sized elongate tie-down element 1402, such as a rope, cord, string or other appropriately chosen elongate tie-down element 1402 such that it is sufficiently wedged between a gap between inner coil 1306 and outer coil 1308. This can be repeated by wrapping around and between coils 1306, 1308 of assembly 1300 as many times as desired or appropriate for a particular embodiment.

FIGS. 15A-15F show an example embodiment of a concentric counter coil tie-down assembly 1500 with a cylindrical mounting component 1522 from various views.

Figure 15A:
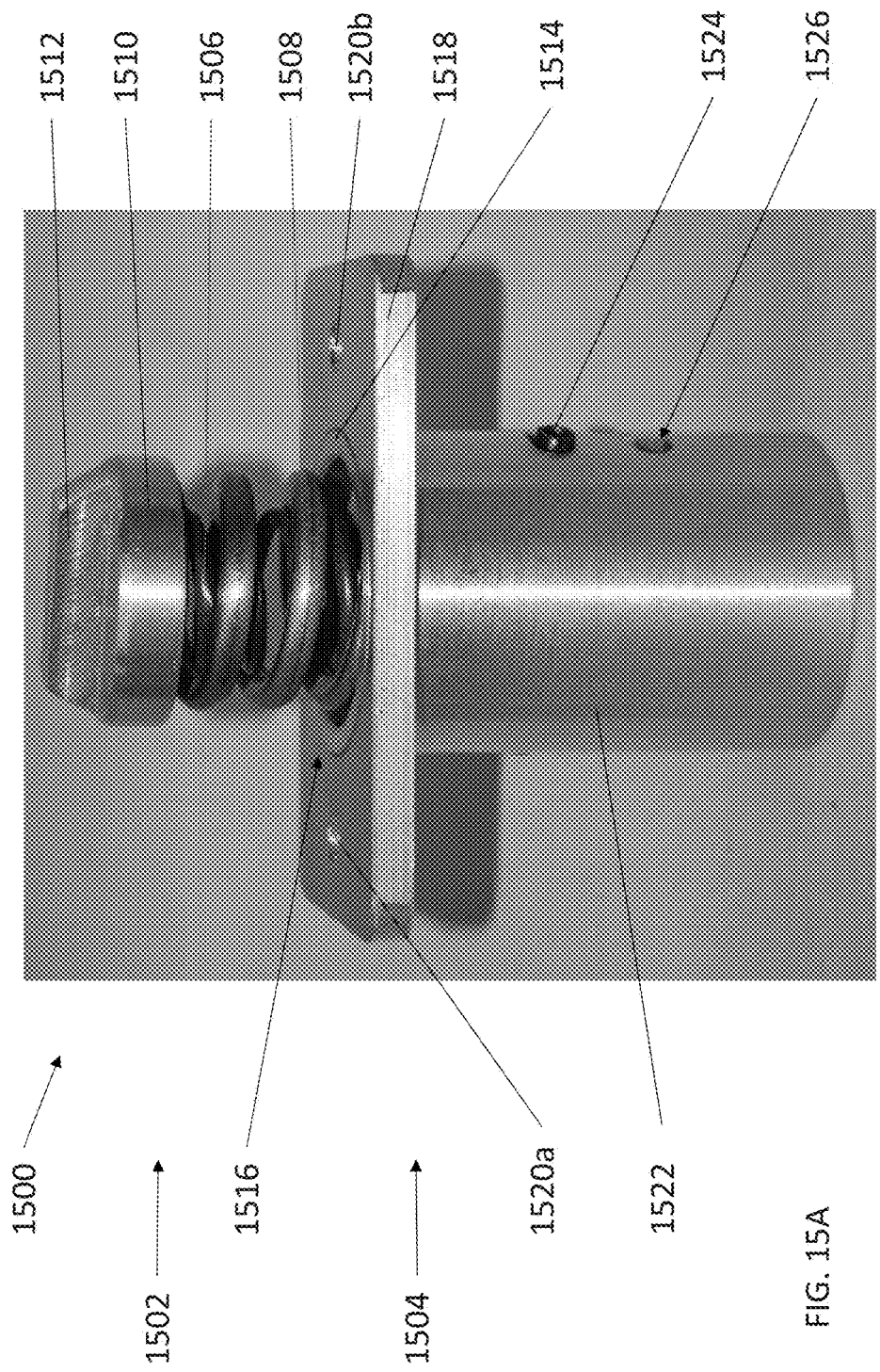
FIG. 15A shows an example embodiment of a concentric counter coil tie-down assembly with a cylindrical mounting component from a front perspective view.

FIG. 15A shows an example embodiment of a concentric counter coil tie-down assembly 1500 with a cylindrical mounting component 1522 from a front perspective view. In the example embodiment, assembly 1500 includes an upper section 1502 and a lower section 1504. As shown in the example embodiment, upper section includes a cap 1510 with a gripping ridge 1512 coupled to an inner coil 1506 and an outer coil 1508. Gripping ridge 1512 of cap 1510 can allow a user to move and adjust upper section 1502 with respect to lower section 1504.

As also shown in the example embodiment, inner and outer coils 1506 and 1508 respectively can be coupled with an inner cylinder 1528 that can be slidably inserted within a top area 1514 of cylindrical component 1522. A permanent coupling area 1516 can allow cylindrical component 1522 to fit within a complementary sized hole in mounting plate 1518 of lower section 1504.

Mounting plate 1518 can include one or a plurality of mounting screw holes 1520a, 1520b to allow for mounting with a desired mounting location. Cylindrical mounting component 1522 can be a hollow outer mounting cylinder that includes one or more tracks 1526 through the wall of cylindrical mounting component 1522 and can function as height positioning grooves. These tracks 1526 can allow a user to adjust a height of an inner cylinder 1528 with respect to cylindrical mounting component 1522.

Inner cylinder 1528 can be complementary sized to slidably fit within a hollow interior of cylindrical mounting component 1522. This can allow inner cylinder 1528 to be slidably adjusted along an inner axis within cylindrical mounting component 1522 using one or more set pins 1524, which can be permanently coupled with inner cylinder 1528 and extend radially outward from an exterior surface of inner cylinder 1528.

Figure 15B:
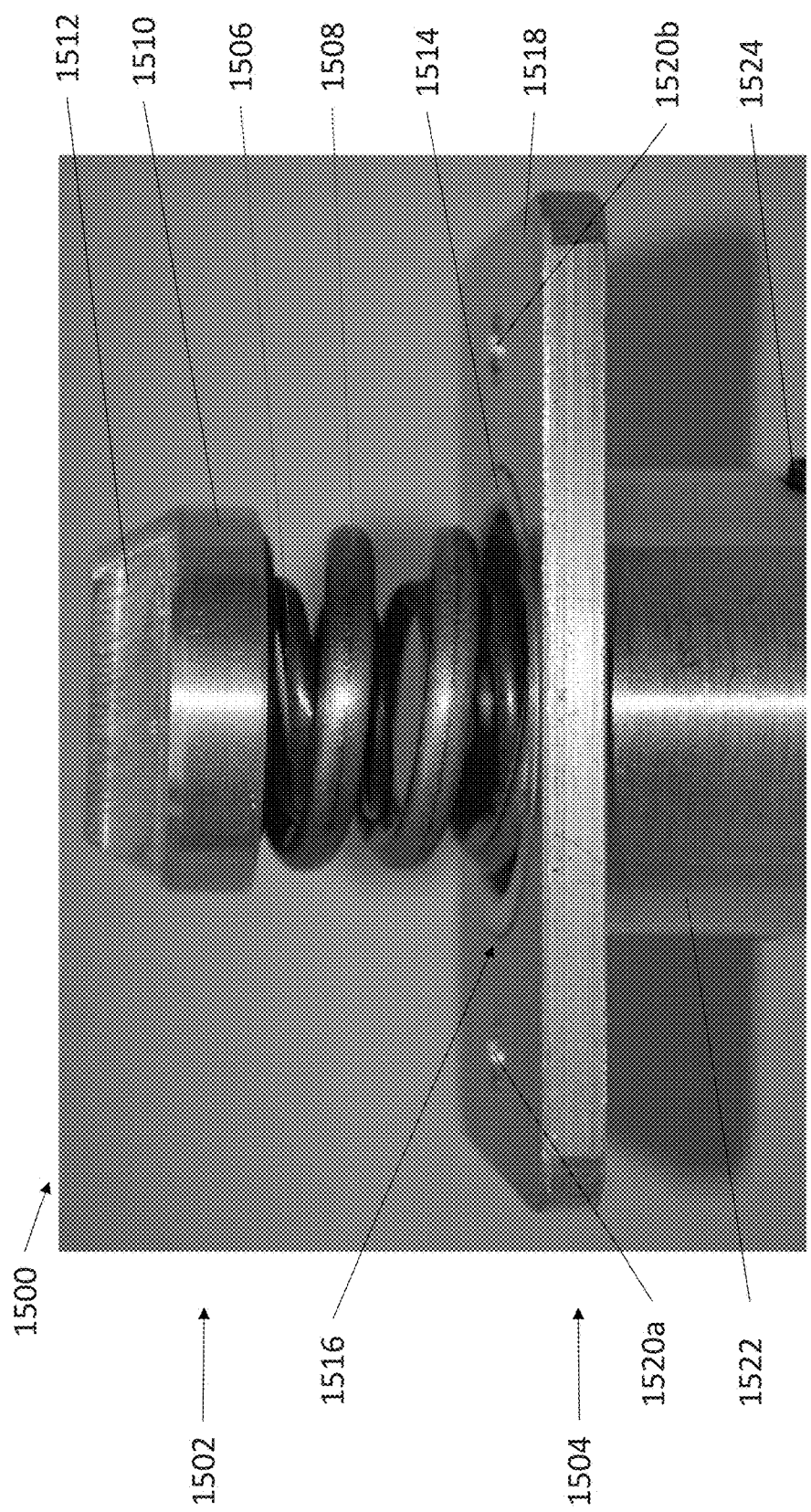
FIG. 15B shows an example embodiment of a concentric counter coil tie-down assembly with a cylindrical mounting component from a close-up front perspective view.

FIG. 15B shows an example embodiment of a concentric counter coil tie-down assembly 1500 with a cylindrical mounting component 1522 from a close-up front perspective view.

Figure 15C:
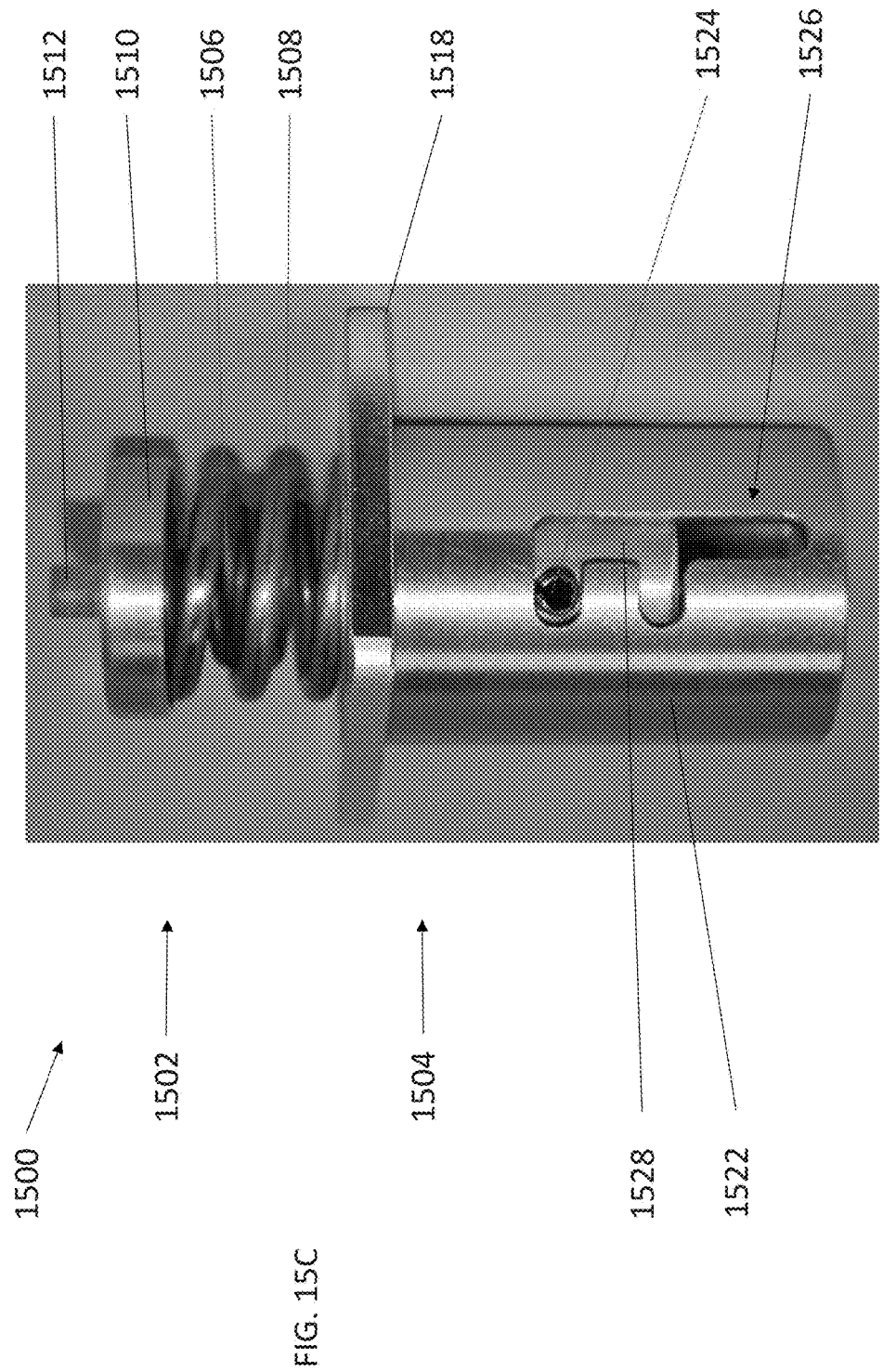
FIG. 15C shows an example embodiment of a concentric counter coil tie-down assembly with a cylindrical mounting component from an oblique side-perspective view.

FIG. 15C shows an example embodiment of a concentric counter coil tie-down assembly 1500 with a cylindrical mounting component 1522 from an oblique side-perspective view.

Figure 15D:
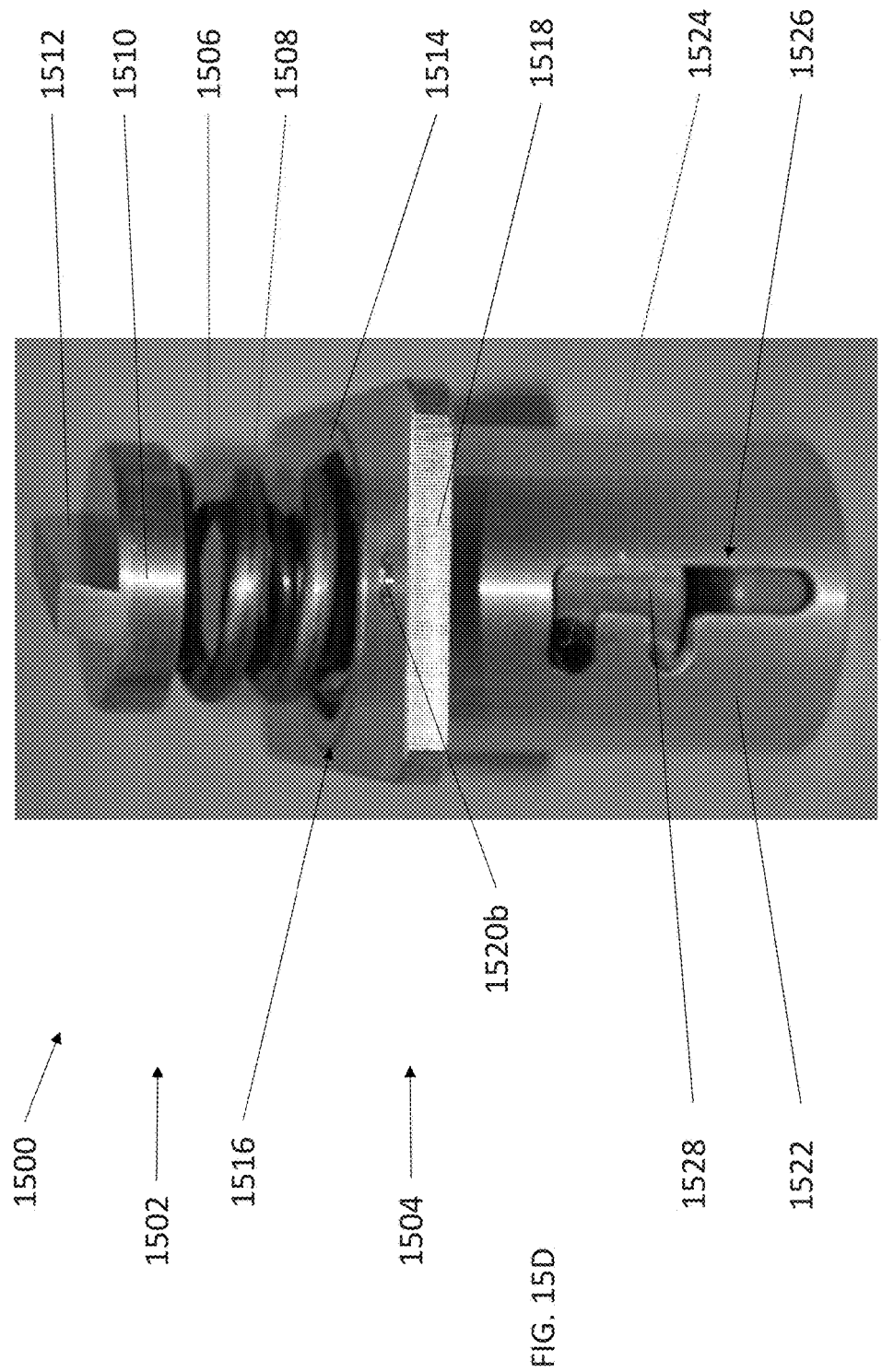
FIG. 15D shows an example embodiment of a concentric counter coil tie-down assembly with a cylindrical mounting component from a top-down side perspective view.

FIG. 15D shows an example embodiment of a concentric counter coil tie-down assembly 1500 with a cylindrical mounting component 1522 from a top-down side perspective view.

Figure 15E:
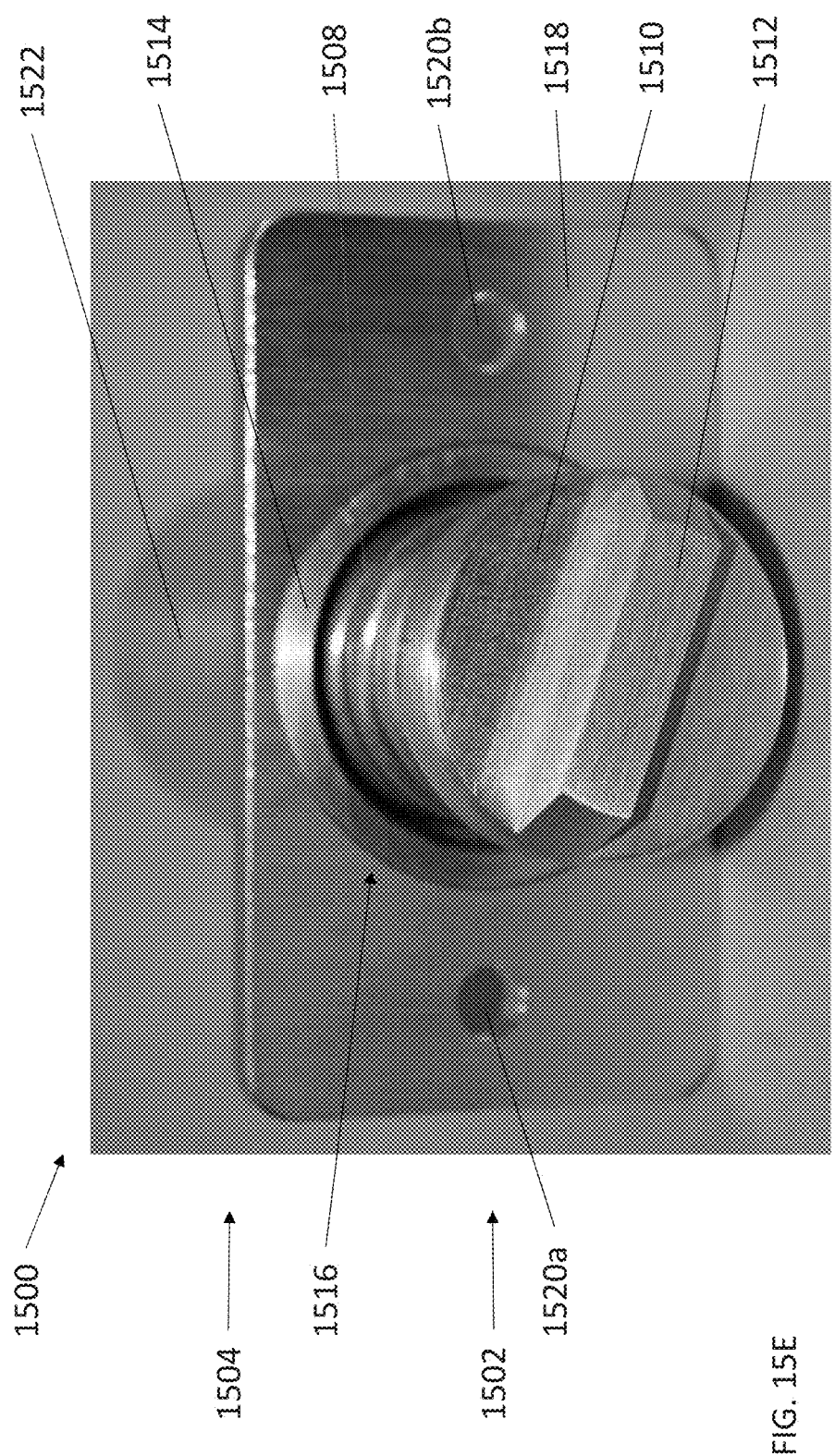
FIG. 15E shows an example embodiment of a concentric counter coil tie-down assembly with a cylindrical mounting component from a top-down perspective view.

FIG. 15E shows an example embodiment of a concentric counter coil tie-down assembly 1500 with a cylindrical mounting component 1522 from a top-down perspective view.

Figure 15F:
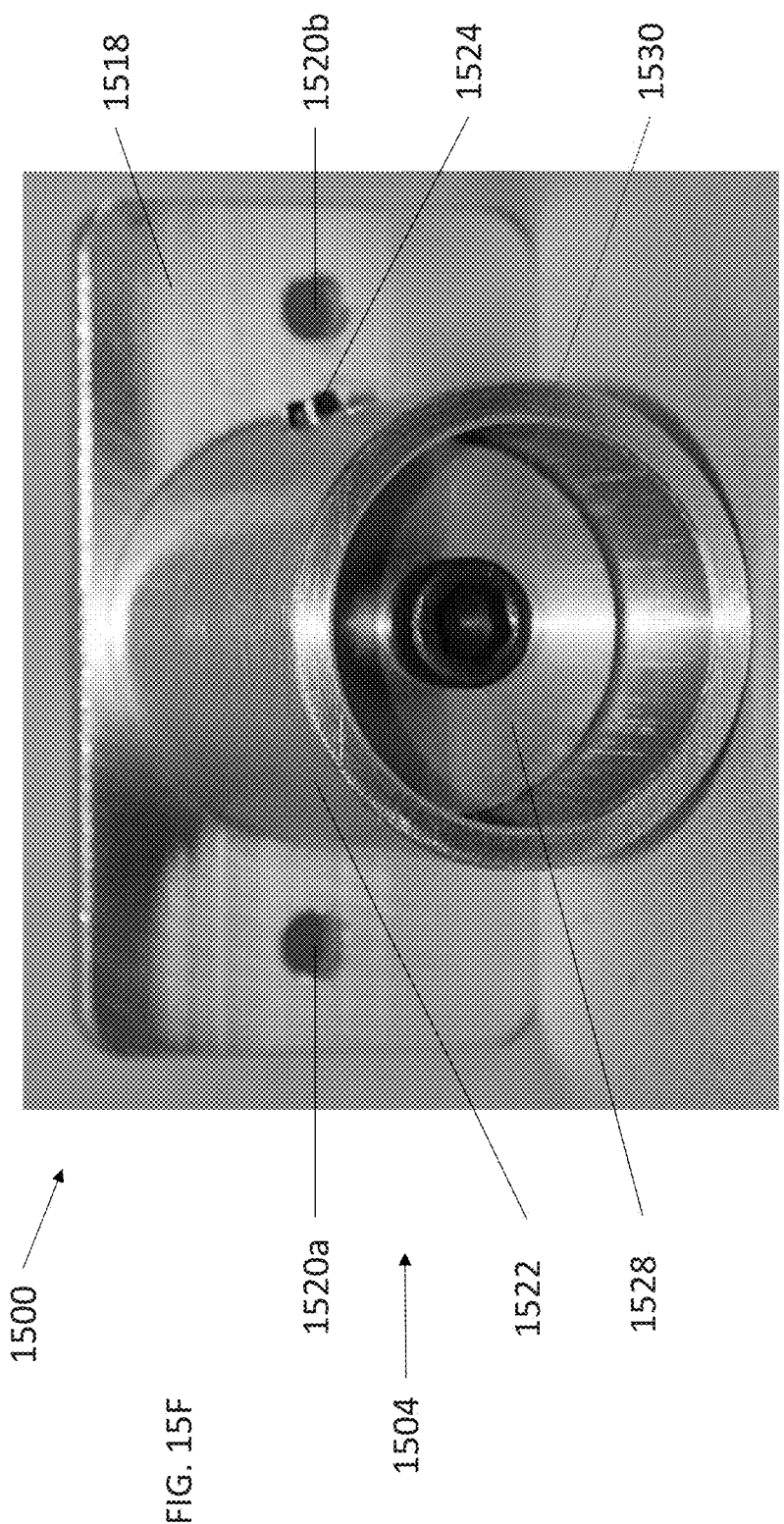
FIG. 15F shows an example embodiment of a concentric counter coil tie-down assembly with a cylindrical mounting component from a front bottom-up perspective view.

FIG. 15F shows an example embodiment of a concentric counter coil tie-down assembly 1500 with a cylindrical mounting component 1522 from a front bottom-up perspective view. A secondary post 1530 can be a base coil bolt and can be coupled to a bottom surface of inner cylinder 1528 for coupling upper section 1502 with cylindrical mounting component 1522 of lower section 1504.

In an example embodiment, mounting plate 1518 of lower section 1504 of concentric counter coil tie-down assembly 1500 can be mounted in a desired location, such as on an upper surface of a side wall of a pickup truck bed using screws through mounting screw holes 1520a, 1520b. When not in use, upper section 1502 can be partially or completely housed within cylindrical mounting component 1522 of lower section 1504 by adjusting its position vertically within cylindrical mounting component 1522 using gripping ridge 1512 to rotate (if necessary) and lower upper section 1502 to a lowest position of track 1526. Upper section 1502 can be moved to one or more use positions by drawing it upward with respect to lower section 1504 and rotating it to lock it into position on a horizontal section of track 1526, as held in place by set pins 1524.

FIG. 16A-16H show an example embodiment of a concentric counter coil tie-down assembly 1500 with a cylindrical mounting component 1522 and an elongate tie-down element 1602 from various view.

Figure 16A:
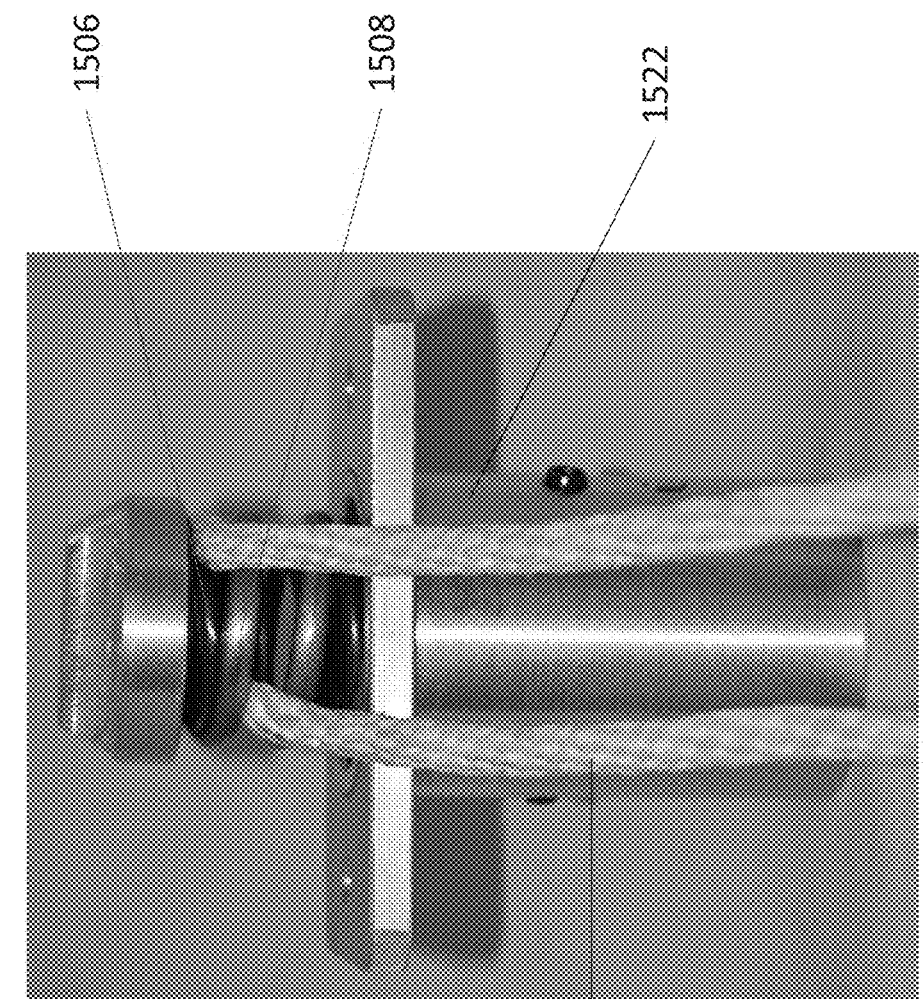
FIG. 16A shows an example embodiment of a concentric counter coil tie-down assembly with a cylindrical mounting component and an elongate tie-down element from a front perspective view.

FIG. 16A shows an example embodiment of a concentric counter coil tie-down assembly 1500 with a cylindrical mounting component 1522 and an elongate tie-down element 1602 from a front perspective view. As shown in the example embodiment and described elsewhere herein, in order to secure items and objects, an assembly 1500 user can tightly pull an appropriately sized elongate tie-down element 1602, such as a rope, cord, string or other appropriately chosen elongate tie-down element 1602 such that it is sufficiently wedged between a gap between inner coil 1506 and outer coil 1508. This can be repeated by wrapping around and between coils 1506, 1508 of assembly 1500 as many times as desired or appropriate for a particular embodiment.

Figure 16B:
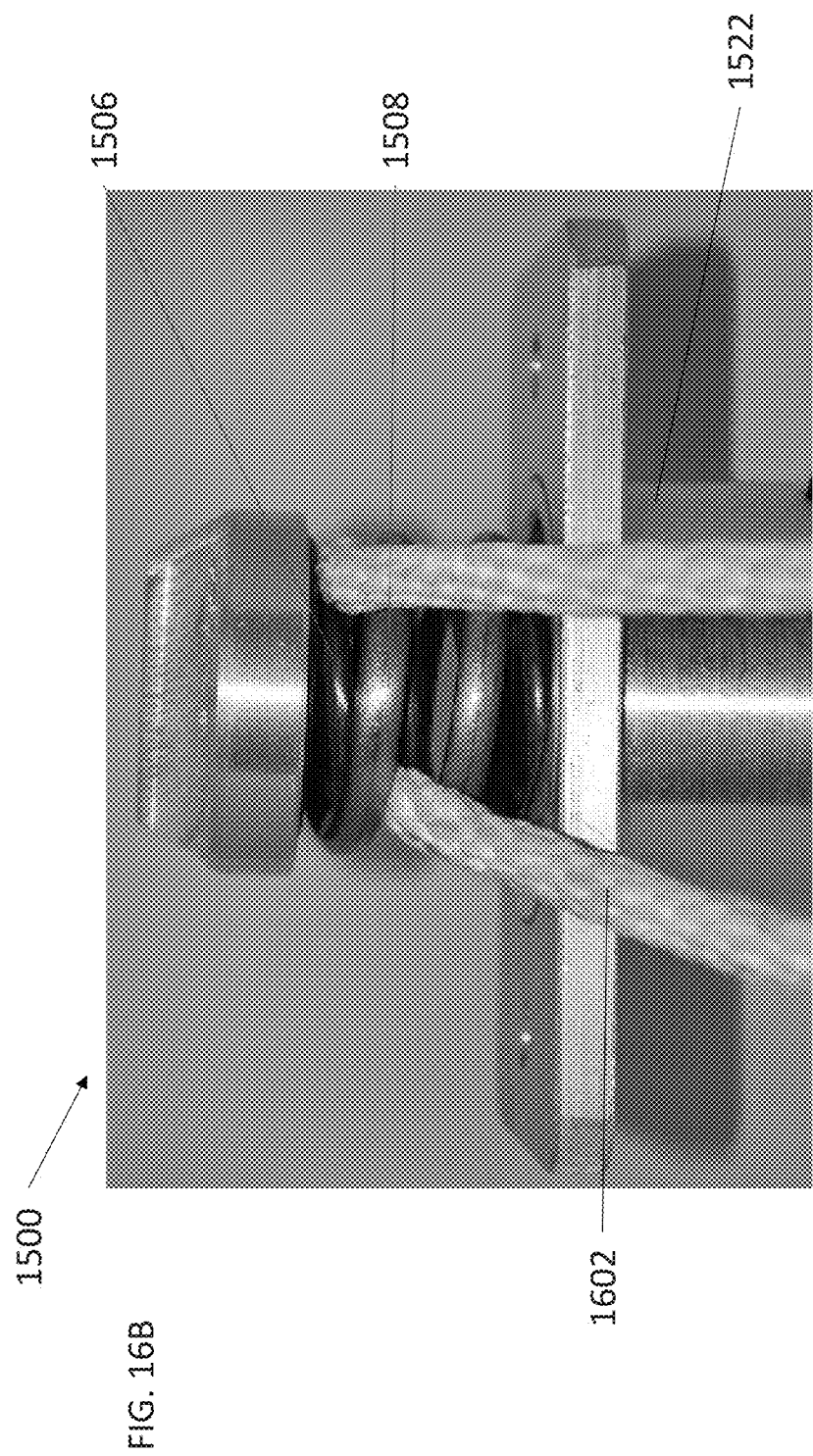
FIG. 16B shows an example embodiment of a concentric counter coil tie-down assembly with a cylindrical mounting component and an elongate tie-down element from a close-up front perspective view.

FIG. 16B shows an example embodiment of a concentric counter coil tie-down assembly 1500 with a cylindrical mounting component 1522 and an elongate tie-down element 1602 from a close-up front perspective view.

Figure 16C:
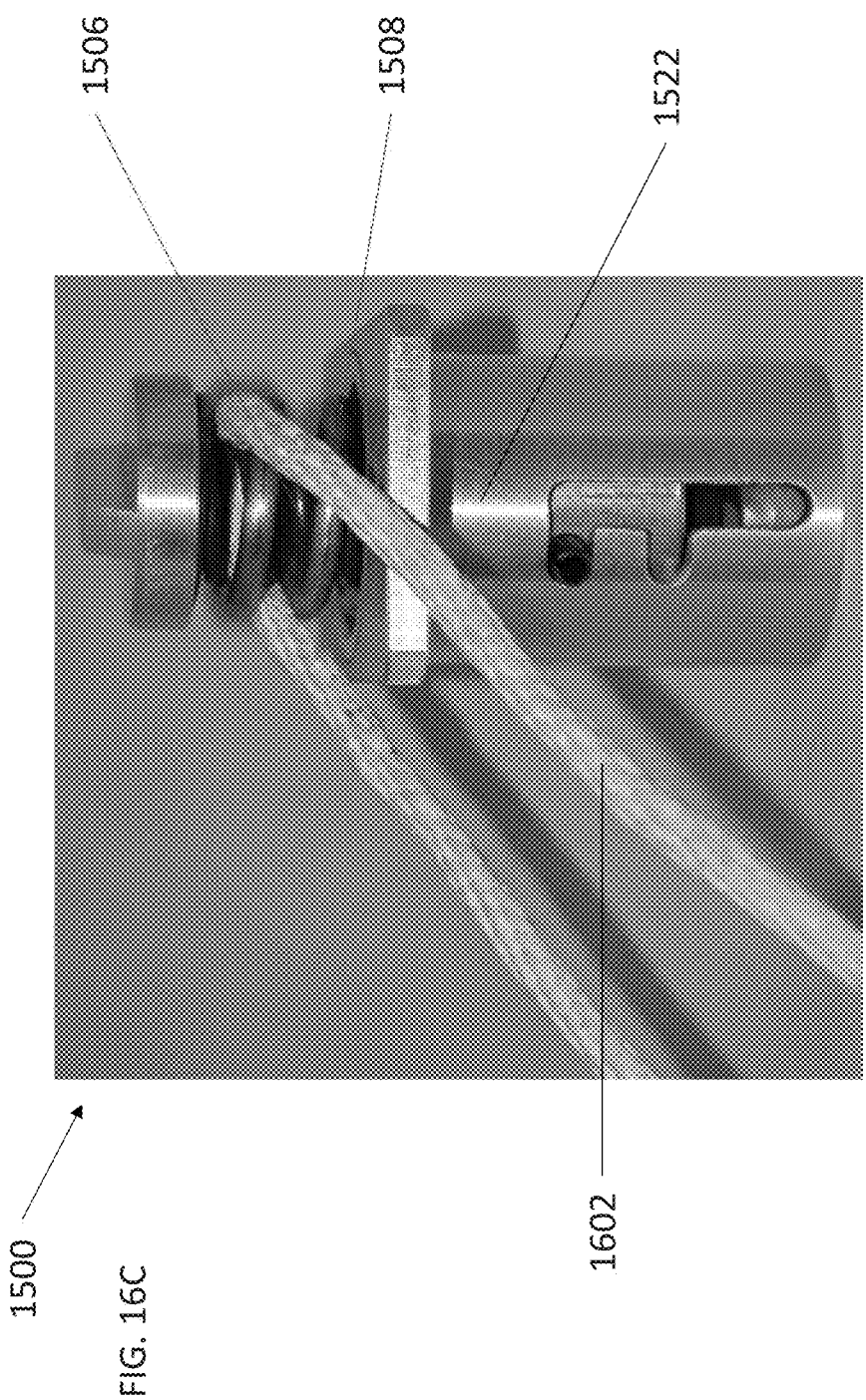
FIG. 16C shows an example embodiment of a concentric counter coil tie-down assembly with a cylindrical mounting component and an elongate tie-down element from a top-down side perspective view.

FIG. 16C shows an example embodiment of a concentric counter coil tie-down assembly 1500 with a cylindrical mounting component 1522 and an elongate tie-down element 1602 from a top-down side perspective view.

Figure 16D:
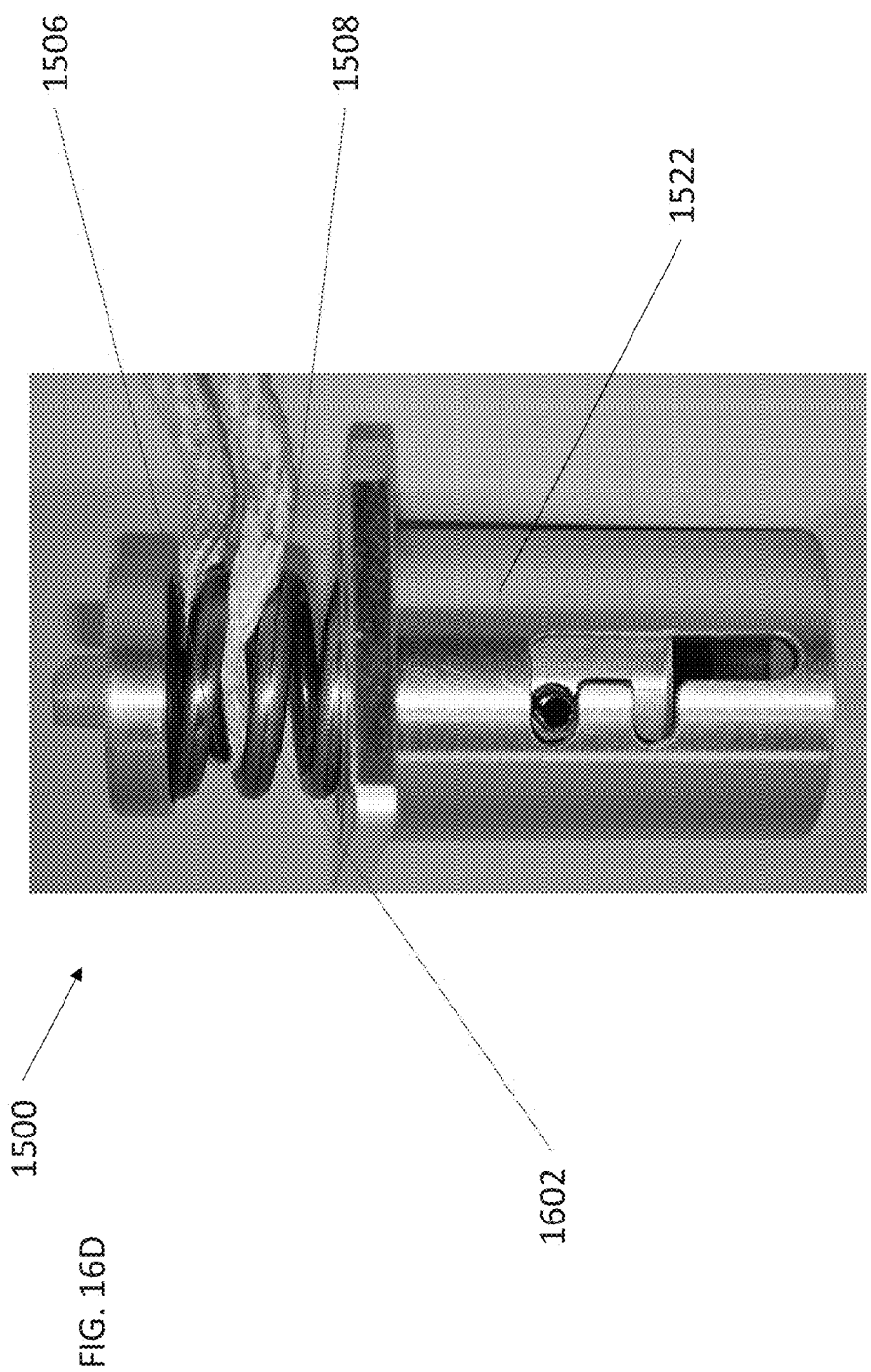
FIG. 16D shows an example embodiment of a concentric counter coil tie-down assembly with a cylindrical mounting component and an elongate tie-down element from an oblique side-perspective view.

FIG. 16D shows an example embodiment of a concentric counter coil tie-down assembly 1500 with a cylindrical mounting component 1522 and an elongate tie-down element 1602 from an oblique side-perspective view.

Figure 16E:
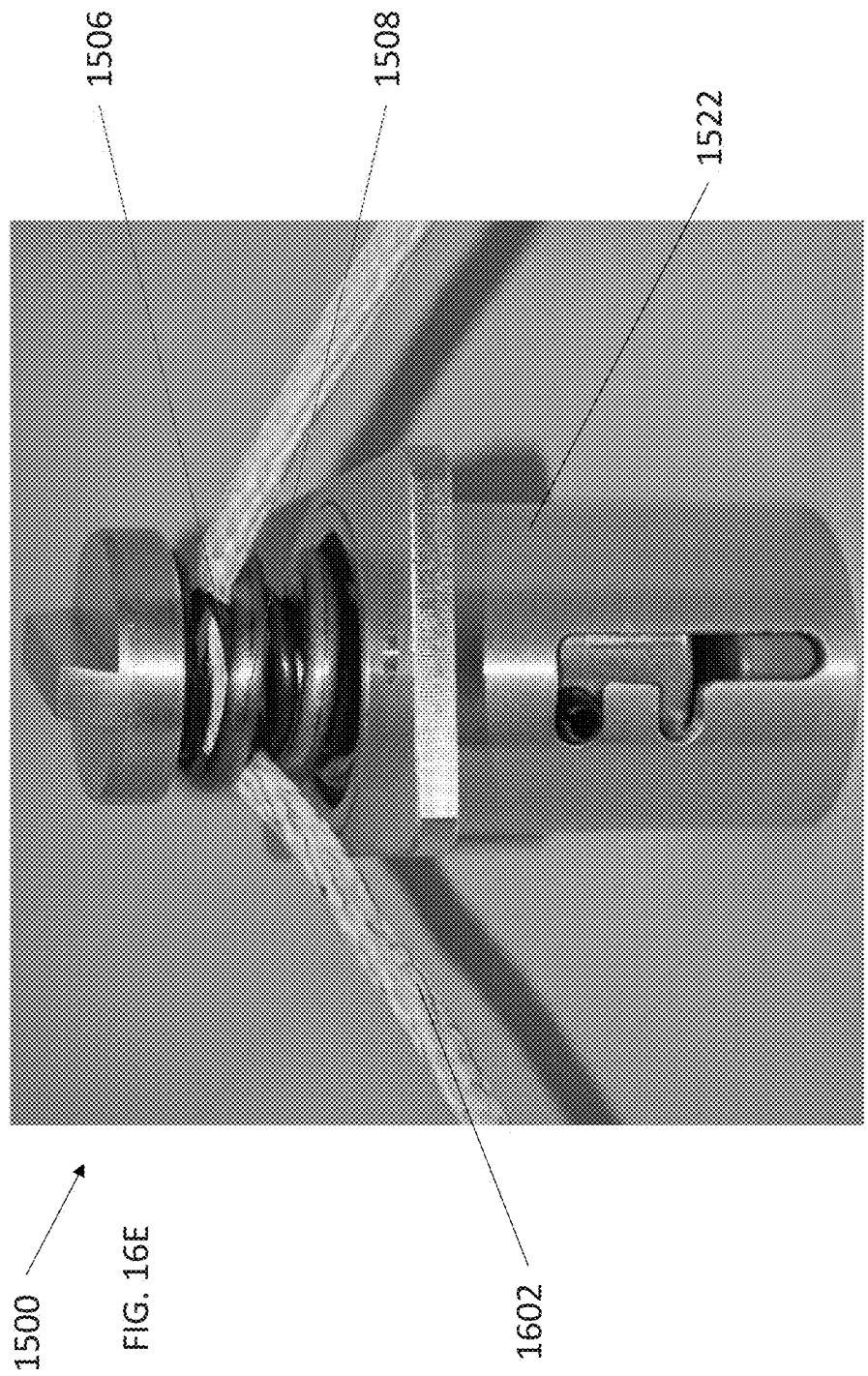
FIG. 16E shows an example embodiment of a concentric counter coil tie-down assembly with a cylindrical mounting component and an elongate tie-down element from an oblique side-perspective view.

FIG. 16E shows an example embodiment of a concentric counter coil tie-down assembly 1500 with a cylindrical mounting component 1522 and an elongate tie-down element 1602 from an oblique side-perspective view.

Figure 16F:
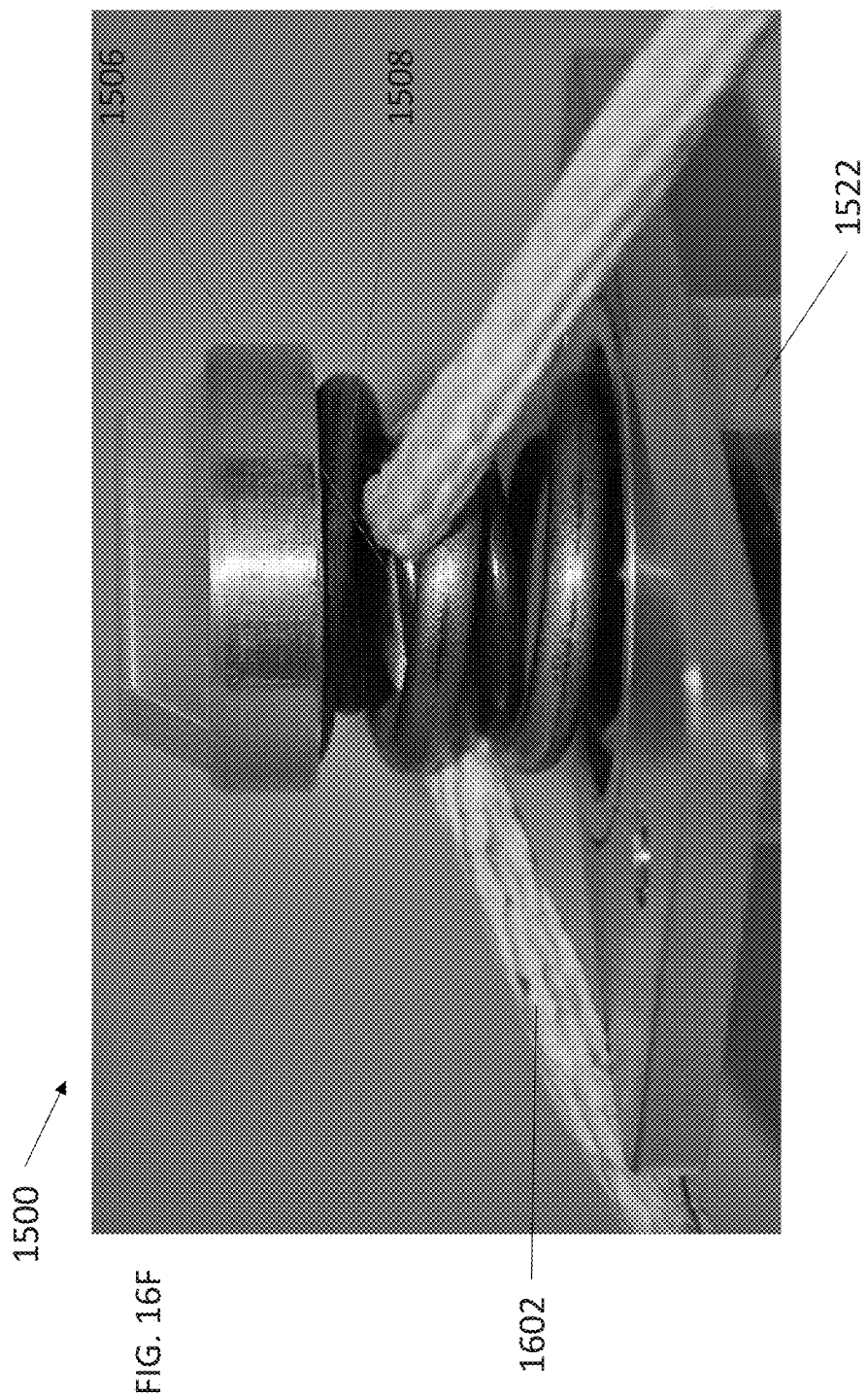
FIG. 16F shows an example embodiment of a concentric counter coil tie-down assembly with a cylindrical mounting component and an elongate tie-down element from a close-up oblique side-perspective view.

FIG. 16F shows an example embodiment of a concentric counter coil tie-down assembly 1500 with a cylindrical mounting component 1522 and an elongate tie-down element 1602 from a close-up oblique side-perspective view.

Figure 16G:
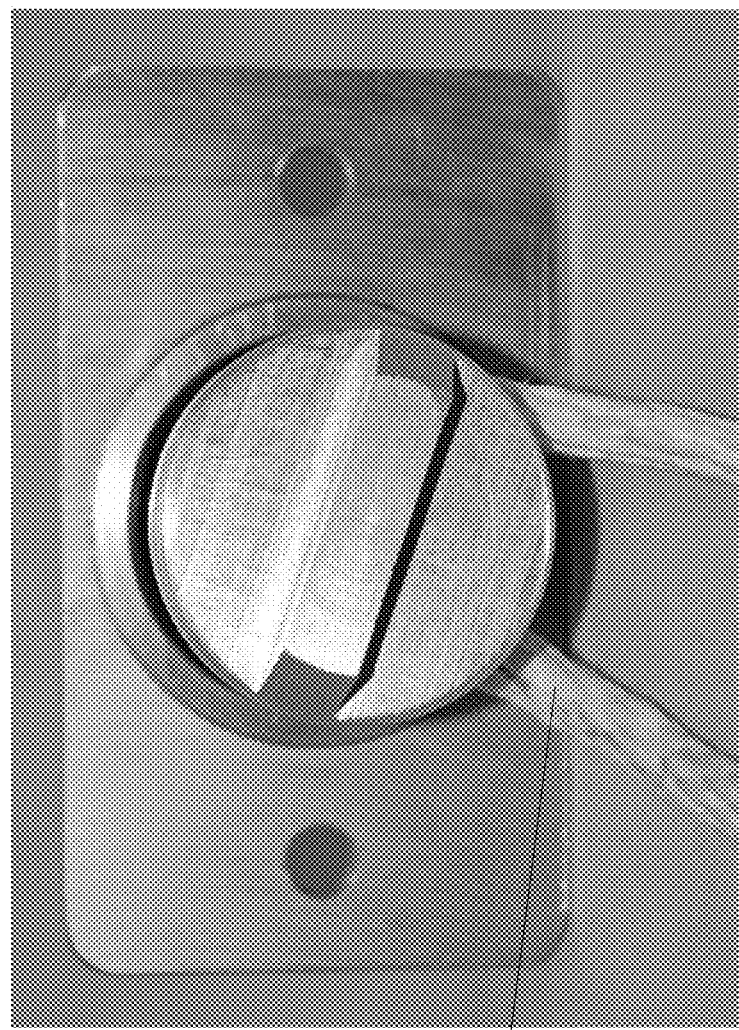
FIG. 16G shows an example embodiment of a concentric counter coil tie-down assembly with a cylindrical mounting component and an elongate tie-down element from a top-down perspective view.

FIG. 16G shows an example embodiment of a concentric counter coil tie-down assembly 1500 with a cylindrical mounting component 1522 and an elongate tie-down element 1602 from a top-down perspective view.

Figure 16H:
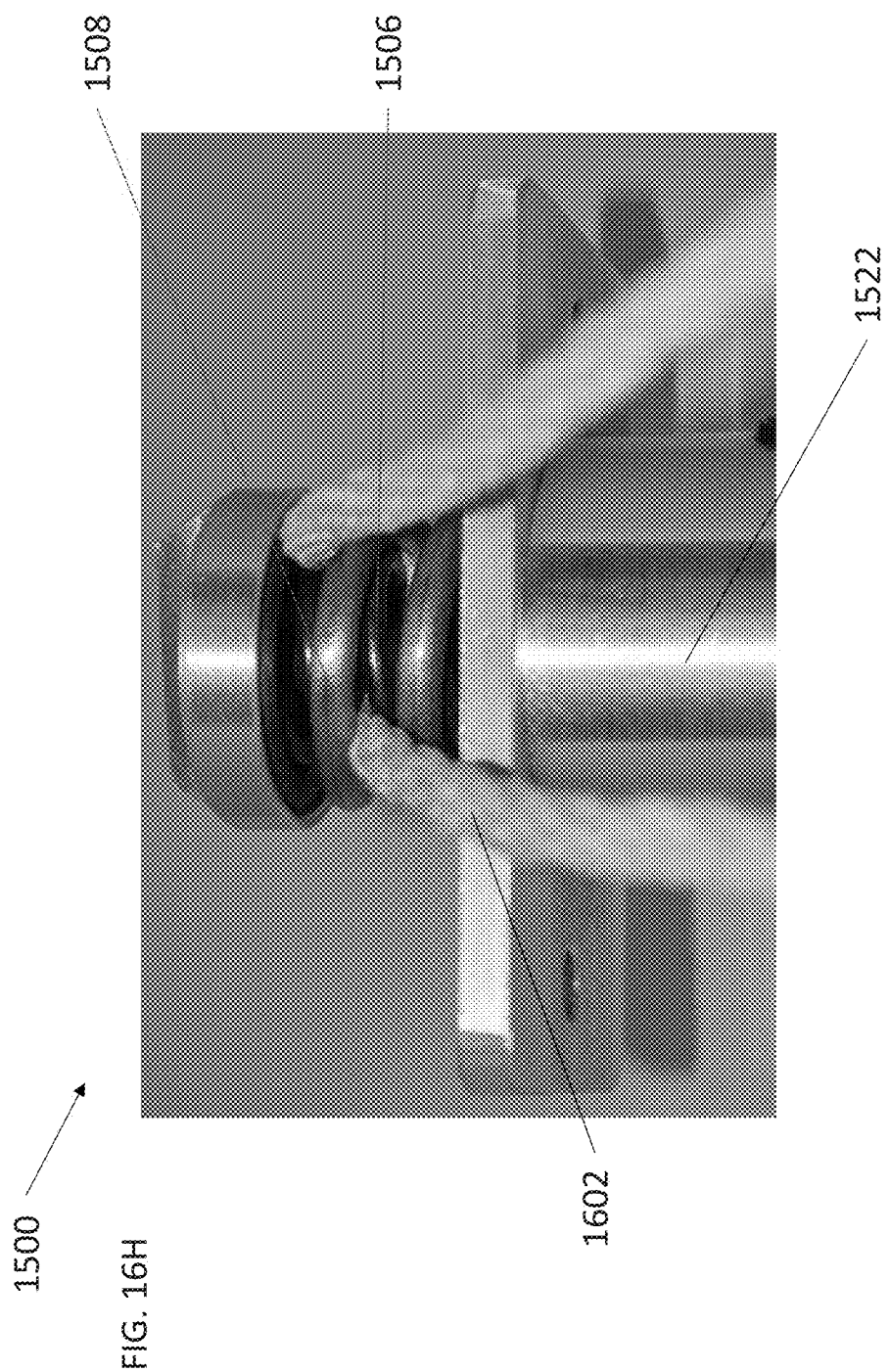
FIG. 16H shows an example embodiment of a concentric counter coil tie-down assembly with a cylindrical mounting component and an elongate tie-down element from a front bottom-up perspective view.
Figure 17A:
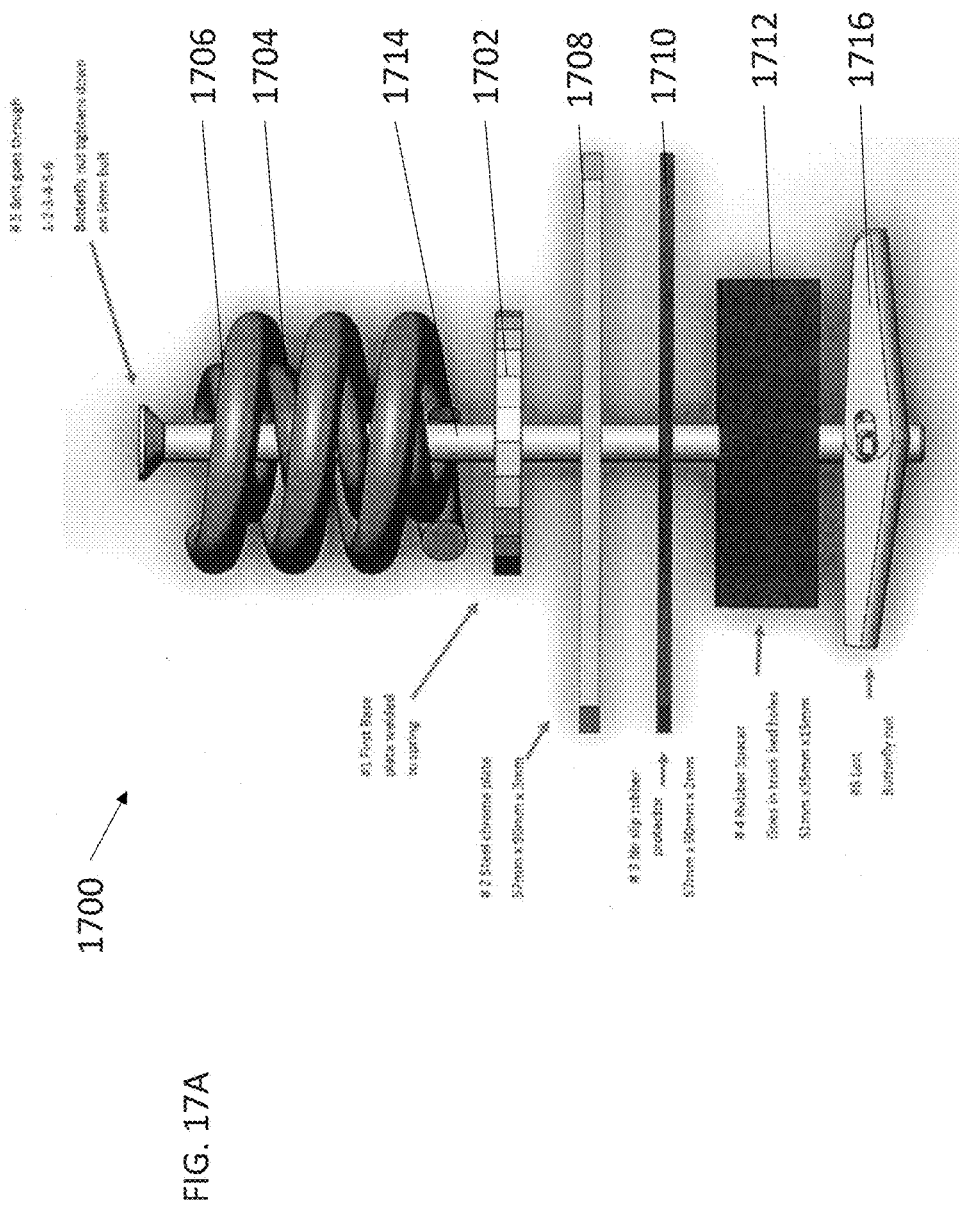
Figure 17C:
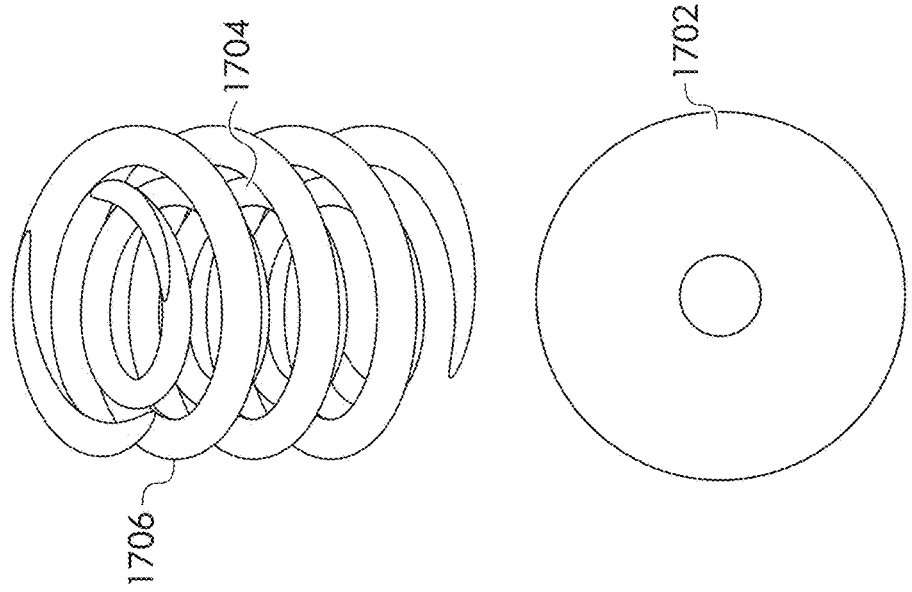
Figure 17B:
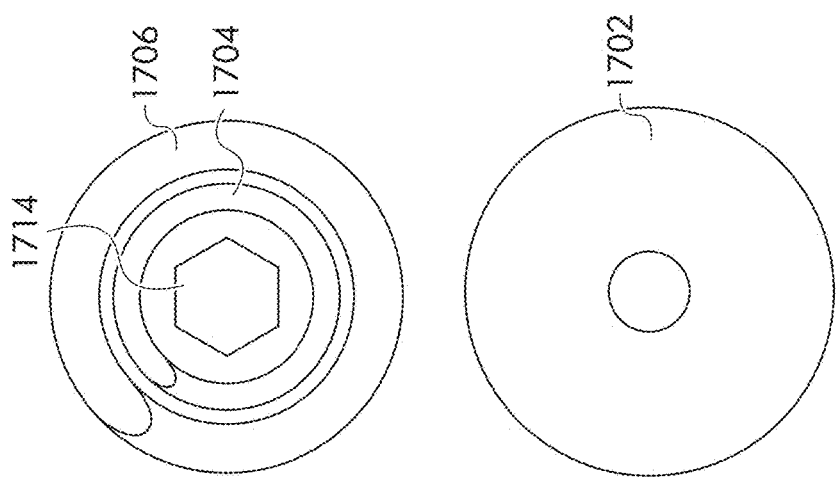
Figure 17D:
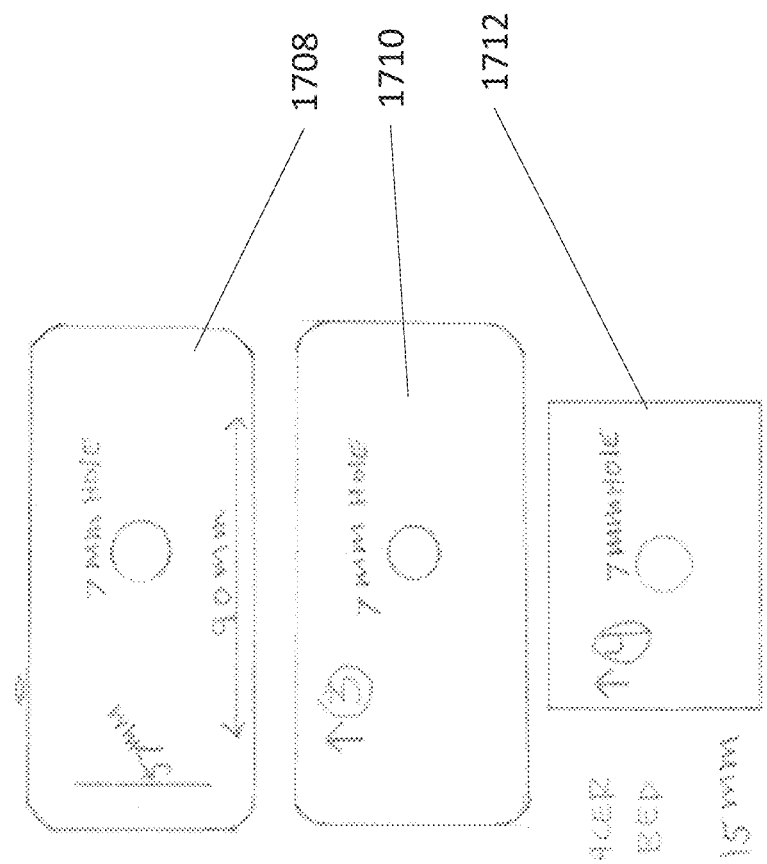

FIG. 16H shows an example embodiment of a concentric counter coil tie-down assembly 1500 with a cylindrical mounting component 1522 and an elongate tie-down element 1602 from a front bottom-up perspective view.

FIGS. 17A-17F show an example embodiment diagram of a concentric counter coil tie-down assembly 1700 from various views. With respect to the example embodiment, a manufacturing process will now be described. First, a base 1702 can be welded to first inner spring 1704 and outer spring 1706. Next a steel chrome plate 1708 can be coupled with base 1702. A non-slip rubber protector 1710 can be coupled to or otherwise arranged adjacent to plate 1708 before a rubber spacer 1712 is arranged on the opposite side of rubber protector 1710. Bolt 1714 can be slidably coupled through each of these components through complementary sized holes in their centers before being secured by a butterfly nut 1716 or other securing mechanism.

In some contemplated embodiments, a miniature version of the counter-coil apparatuses described herein can be used in a shoe and lace system in order to secure the lace with respect to the shoe. In some of these embodiments, the miniature version can include concentric counter-coils with a single helical turn each, while in other embodiments, include concentric counter-coils with multiple helical turns each. This can be mounted or otherwise secured to shoes in convenient locations to replace the need for tying the shoelaces together while still securing them in location.

Systems, apparatuses and methods as described herein can be created in a variety of different sizes, which can be embodiment specific and dependent on a maximum load weight of objects or items a user desires to secure in the particular embodiment. For instance, an apparatus or system intended for mooring a ship would be much larger and require much greater sturdiness than one to prevent items from moving in a pickup-truck bed.

Related to this concept, coil size, height, cross sectional profile (e.g. diameter in circular embodiments) can be customized to provide securing for different cord or rope cross section sizes. In general, the gap between loops of the coils can be a limiting factor in determining the maximum rope size that can be effectively secured in a particular embodiment.

Also related to these concepts, various component materials used to implement the embodiments described herein can be embodiment specific. These materials can include, but are not limited to: molded high strength plastics, powder coated steel, stainless steel, aluminum, iron, brass, carbon fiber, metal composites, plastic composites and various combinations thereof.

Manufacture of various embodiments can likewise be accomplished in embodiment specific fashion.

In various embodiments, manufacturing methods can be practiced in a modular fashion, such as creating an upper unit section and a lower unit section. In some embodiments, the upper unit section can be manufactured by first coupling an inner coil to an upper mounting plate and then coupling an outer coil to the upper mounting plate. Next, a cap, such as an upper housing, can be coupled to an end of the inner coil, outer coil or both, opposite the upper mounting plate. Lower units can similarly be manufactured by mounting lower unit components to a lower mounting plate, which in some embodiments is the same as the upper mounting plate.

In some embodiments, a first end cap, such as an upper housing, can be coupled to a first end of the inner and outer coils. Similarly, a second end cap, such as a lower housing, can be coupled to a second, opposite end of the one or more coils. In these embodiments, second end cap can then be coupled with a mounting plate.

In some embodiments, one or more coils can be directly coupled to a mounting location. As such, no separate mounting plate or lower housing may be necessary or even desired. Those in the art would understand that various manufacturing steps can be changed in order or omitted based on the unique circumstances, conditions or orientations of creating particular assemblies. Likewise, mounting base plates can be customized to allow for multiple uses or individual specialty uses (e.g. a truck mounting versus a trailer mount).

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. An apparatus for securing one or more items with respect to a fixed location using an elongate tie-down element, comprising:
    a mounting assembly;
    a first cylindrical coil having a first radius from a central axis, including at least one first coil loop; and
    a second cylindrical coil having a second radius from the central axis, including at least one second coil loop, and oriented coaxially at least partially around the first cylindrical coil; and
    at least one gap, formed in a space between the at least one first coil loop and at least one second coil loop, that is oriented substantially horizontally,
    wherein the first and second cylindrical coils are each coupled to a surface of the mounting assembly, and
    wherein, when the tie-down element is snugly pulled into at least one gap, it operatively secures the one or more items by inhibiting their movement.

2. The apparatus of claim 1, wherein the first cylindrical coil has a first, clockwise helix shape and the second cylindrical coil has a second, counter-clockwise helix shape.

3. The apparatus of claim 2, wherein the first cylindrical coil and second cylindrical coil have a ninety-degree offset in orientation.

4. The apparatus of claim 3, further comprising:
    a central post coupled with the mounting assembly, located centrally and oriented coaxially with respect to the first and second cylindrical coils.

5. The apparatus of claim 1, wherein the mounting assembly further comprises:
    a first mounting plate, including:
        the surface coupled to the first and second cylindrical coil and a mounting surface.

6. The apparatus of claim 4, wherein the mounting assembly further comprises:
    a clamp, removably coupled with the mounting surface of the first mounting plate such that it can secure the apparatus to a fixed mounting location.

7. The apparatus of claim 6, further comprising:
    at least one separator member for separating the clamp, the opposing surface of the mounting plate or both from the fixed mounting location.

8. The apparatus of claim 6, further comprising:
    a central post slidably coupled with the mounting assembly, located centrally and oriented coaxially with respect to the first and second cylindrical coils,
    wherein the clamp, is removably coupled with the mounting surface of the first mounting plate by coupling with the central post.

9. The apparatus of claim 1, wherein the mounting assembly further comprises:
    a first housing coupled with the mounting surface, having a third radius and oriented coaxially with respect to the first and second cylindrical coils,
    wherein the third radius is greater than the second radius.

10. The apparatus of claim 9, further comprising:
    a central post coupled at a first end with the mounting assembly, located centrally, and oriented coaxially with respect to the first and second cylindrical coils.

11. The apparatus of claim 10, further comprising:
    a second housing coupled with a second end of the central post, having a fourth, radius and oriented coaxially with respect to the first and second cylindrical coils,
    wherein the fourth radius is the same as the third radius and wherein a gap between the first housing and the second housing separates the first housing and the second housing, such that the first and second cylindrical coils are operably accessible through the gap between the first housing and the second housing.

12. The apparatus of claim 11, wherein the second housing includes at least one drainage hole that operably allows drainage through the second housing.

13. The apparatus of claim 1, wherein the first and second cylindrical coils are permanently coupled at their upper ends.

14. The apparatus of claim 13, further comprising:
    a central post coupled with the mounting assembly, located centrally and oriented coaxially with respect to the first and second cylindrical coils.

15. A method for securing at least one item with respect to a fixed location using an elongate tie-down element, comprising:
    orienting the elongate tie-down element substantially near the at least one item such that it can affects movement of the item in at least one direction during operation, when coupled with a tie-down element securing apparatus; and
    securing the elongate tie-down element to the tie-down element securing apparatus that is mounted to the fixed location, by tightly wedging the elongate tie-down element in at least one gap oriented horizontally between at least one loop of a first cylindrical coil and at least one loop of a second cylindrical coil of the tie-down element securing apparatus, such that the elongate tie-down element is at least partially prevented from moving out of position with respect to the fixed location,
    wherein the tie-down element securing apparatus comprises:
        a mounting assembly mounted to the fixed location and includes a mounting surface and an opposing surface;
        the first cylindrical coil has a first radius from a central axis; and the second cylindrical coil has a second radius from the central axis that is greater than the first radius, wherein the second cylindrical coil is oriented coaxially and at least partially around the first cylindrical coil and the first and second cylindrical coils are each coupled to the opposing surface of the mounting assembly.

16. The method of claim 15, further comprising:

after securing the elongate tie-down element to the tie-down element securing apparatus, a) extending the tie-down element to a next tie-down element securing apparatus of a plurality of tie-down element securing apparatuses;

b) securing the elongate tie-down element to the next tie-down element securing apparatus mounted to a next location by tightly wedging the elongate tie-down element in at least one gap oriented horizontally between at least one loop of the first cylindrical coil and the second cylindrical coil of the next tie-down element securing apparatus, such that the tie-down element is at least partially prevented from moving out of position with respect to the next location; and repeating a) and b) as necessary until the elongate tie-down element has been secured to some or all of the plurality of tie-down element securing apparatuses.

17. A system for securing an item near a fixed location using an elongate tie-down element associated with a close proximity of the item, comprising:

at least one tie-down element securing apparatus, operable to secure a tie-down element between at least one loop of a first cylindrical coil and at least one loop of a second cylindrical coil of the cord-member securing apparatus upon a user tightly wedging the elongate tie-down element in at least one gap oriented horizontally between the loops, such that the elongate tie-down element is at least partially prevented from moving out of position with respect to the fixed location and thereby secures the item in close proximity to the elongate tie-down element by at least partially preventing the item from moving, wherein the at least one tie-down element securing apparatus comprises:

a mounting assembly mounted at a mounting location;

the first cylindrical coil has a first radius from a central axis; and the second cylindrical coil has a second radius from the central axis and located coaxially at least partially around the first cylindrical coil, wherein the first and second cylindrical coils are each coupled to a surface of the mounting assembly.

18. The system of claim 17, wherein the first cylindrical coil of the at least one tie-down element securing apparatus has a first, clockwise helix shape and the second cylindrical coil of the at least one tie-down element securing apparatus has a second, counter-clockwise helix shape.

19. The system of claim 18, wherein the first cylindrical coil and second cylindrical coil of the at least one tie-down element securing apparatus have a ninety-degree offset in orientation.

20. The system of claim 19, further comprising:

a central post coupled with the mounting assembly of the at least one tie-down element securing apparatus and located centrally and oriented coaxially with respect to the first and second cylindrical coils.

21. The system of claim 17, wherein the mounting assembly of the at least one tie-down element securing apparatus further comprises:

a first mounting plate, including:

the surface coupled to the first and second cylindrical coils; and a mounting surface.

* * * * *